US008152309B2

(12) United States Patent
Hasegawa

(10) Patent No.: US 8,152,309 B2
(45) Date of Patent: Apr. 10, 2012

(54) IMAGE DISPLAY APPARATUS, IMAGE DISPLAY SYSTEM, AND IMAGE DISPLAY METHOD

(75) Inventor: Hiroshi Hasegawa, Chino (JP)

(73) Assignee: Seiko Epson Corporation, Tokyo (JP)

(*) Notice: Subject to any disclaimer, the term of this patent is extended or adjusted under 35 U.S.C. 154(b) by 453 days.

(21) Appl. No.: 12/208,830

(22) Filed: Sep. 11, 2008

(65) Prior Publication Data

US 2009/0073391 A1 Mar. 19, 2009

(30) Foreign Application Priority Data

Sep. 18, 2007 (JP) ................................ 2007-240526

(51) Int. Cl.
*G03B 21/14* (2006.01)

(52) U.S. Cl. ................ 353/79; 353/38; 353/46; 353/48; 353/49; 353/50; 353/71; 353/72; 353/74; 353/82; 353/89; 353/94; 353/51; 353/119; 359/443

(58) Field of Classification Search .................... 353/69, 353/70, 72, 74, 79, 82, 89, 94, 119, 48, 51; 359/452, 453, 454, 455, 456, 443, 457, 460, 359/448, 459; 348/786, 787, 789, 804, 834, 348/835, 841, 842; 345/1.1, 619, 694
See application file for complete search history.

(56) References Cited

U.S. PATENT DOCUMENTS 6,600,600 B2 * 7/2003 Chen ............................ 359/459
6,709,113 B2 * 3/2004 Segler et al. .................... 353/69
7,012,744 B2 * 3/2006 Sakaguchi .................... 359/456
7,777,949 B2 * 8/2010 Peterson et al. .............. 359/455
7,854,518 B2 * 12/2010 Culbertson et al. ............. 353/69
2002/0089710 A1 * 7/2002 Mizutani et al. ................ 359/15
2002/0154145 A1 * 10/2002 Isakovic et al. ............... 345/643
2004/0216344 A1 * 11/2004 Bateman .................... 40/611.05
2006/0033890 A1 * 2/2006 Hasegawa ....................... 353/94
2006/0262280 A1 * 11/2006 Duffield et al. ................. 353/46
2007/0121206 A1 * 5/2007 Liang et al. ................... 359/443
2007/0211225 A1 * 9/2007 Kondo et al. ................... 353/94
2008/0158669 A1 * 7/2008 O'Keefe et al. ............... 359/443

FOREIGN PATENT DOCUMENTS

JP A-8-227105 9/1996
JP A-2000-089368 3/2000
JP 2003-216087 A * 7/2003
JP A-2003-213868 7/2003
JP A-2004-117579 4/2004
JP U-3103449 6/2004
JP A-2005-115069 4/2005

* cited by examiner

*Primary Examiner* — Georgia Y Epps
*Assistant Examiner* — Sultan Chowdhury
(74) *Attorney, Agent, or Firm* — Oliff & Berridge, PLC

(57) ABSTRACT

An image display apparatus which displays an image as a transmitted projection image includes: a tread-board of a step which has a first projection surface and transmits a projection image projected on the first projection surface; and a cross-board of the step which has a second projection surface and transmits a projection image projected on the second projection surface.

12 Claims, 15 Drawing Sheets

IMAGE DISPLAY APPARATUS, IMAGE DISPLAY SYSTEM, AND IMAGE DISPLAY METHOD

This application claims the benefit of JP 2007-240526, filed in Japan on Sep. 18, 2007, the entire disclosure of which is hereby incorporated by reference in its entirety.

BACKGROUND

1. Technical Field

The present invention relates to an image display apparatus, an image display system, and an image display method.

2. Related Art

With recent development of various types of display technology, a display apparatus (image display apparatus) having a large-sized screen and high resolution has been widely used as a "dynamic poster" or a "bright and attention-attracting advertisement medium" for the purpose of so-called signage use. For example, a large-sized display apparatus containing LED (light emitting diode) as pixels for outdoor use, and a display apparatus including direct-view-type large screen liquid crystal display apparatus, plasma display apparatus, and projector for indoor use have been developed.

For signage application by using the respective display apparatus discussed above, there are advantages and disadvantages for each structure type. For example, the display apparatus containing the LED has high brightness and luminance, easy increase in screen size, and preferable weatherability. However, further increase in pixel density and improvement over color reproducibility and image quality are difficult. On the other hand, the direct-view-type display apparatus such as liquid crystal display device and plasma display apparatus has high degree of installation freedom such as easy establishment and reduced occupation area. As a result, cost reduction can be achieved. However, the freedom of display shape is low and power consumption is high, and thus this type of display apparatus is not appropriate for a display system which utilizes a floor as display unit, for example.

On the other hand, the display apparatus including the projector has advantages such as "high degree of freedom of display shape" and "separability from screen". Thus, this display apparatus is expected to function as display system capable of using the floor as display unit or display system for other signage use which have not been realized by display apparatus in related art.

JP-A-2004-117579 discloses one of the technologies appropriately used for the display apparatus having the "high degree of freedom of display shape", for example. JP-A-2004-117579 shows the technique which displays an image on a plurality of display screens when display surfaces are plural inner surfaces of polyhedron.

JP-A-2003-213868 discloses a display apparatus which has the advantages of "high degree of freedom of display shape" and "separability from screen". According to a step type lighting device shown in JP-A-2003-213868, a light source for emitting illumination light is disposed behind a cross-board (board crossing tread-board) of a step equipped on a building, and a transmission type screen on which illumination light emitted from the light source is projected is installed on the cross-board of the step. In this step type lighting device, a converging lens is provided between the light source and the transmission type screen so as to converge illumination light from the light source on the transmission type screen. Furthermore, JP-A-2003-213868 discloses a step type display unit which controls illumination light such that one image can be produced by combining images formed on the respective cross-boards.

However, the technology disclosed in JP-A-2004-117579 only projects a continuous image on different surfaces by using one or plural projectors. Thus, when this method is applied to the step on the building, it is difficult to project a continuous image on each of the "tread-board" and "cross-board" of the step. Accordingly, this method is difficult to be applied to the display apparatus having the advantages of "high degree of freedom of display shape" and "separability from screen".

According to the technology disclosed in JP-A-2003-213868, one light source is required for one "cross-board" of the step. Thus, the cost and labor for installation increase.

SUMMARY

It is an advantage of some aspects of the invention to provide an image display apparatus, an image display system, and an image display method having high degree of freedom of projection surface shape when a projection image is displayed by using a projection unit such as a projector.

It is another advantage of some aspects of the invention to provide an image display apparatus, an image display system, and an image display method capable of providing separation between a projection unit and a screen when a projection image is displayed by the projection unit such as a projector.

According to a first aspect of the invention, there is provided an image display apparatus which displays an image as a transmitted projection image and includes: a first screen which has a first projection surface and transmits a projection image projected on the first projection surface; and a second screen which has a second projection surface and transmits a projection image projected on the second projection surface. The first screen and the second screen are disposed adjacent to each other such that the normal line of the first projection surface crosses the normal line of the second projection surface.

According to this structure, the two screens are disposed adjacent to each other at a predetermined angle, and each screen transmits the projection image. Thus, a new type of image display apparatus capable of providing advantages such as "high degree of freedom of display shape" and "separability from screen" by using the projection unit such as projector, which cannot be offered by the direct-viewing-type display apparatus, can be realized.

It is preferable that a tread-board of a step is the first screen, and a cross-board of the step is the second screen.

According to this structure, the projection image is projected on the tread-board and the cross-board of the step from the inside of the step. Thus, a new type of image display apparatus capable of providing advantages such as "high degree of freedom of display shape" and "separability from screen" by using the projection unit such as projector, which cannot be offered by the direct-viewing-type display apparatus, can be realized. Moreover, the light source is not required for each cross-board of the step. Thus, cost and labor for installation can be reduced.

It is preferable that the first and second screens of the image display apparatus are disposed adjacent to each other in the horizontal direction.

According to this structure, the two screens are disposed adjacent to each other at a predetermined angle in the horizontal direction, and each screen transmits the projection image. Thus, a new type of image display apparatus capable of providing advantages such as "high degree of freedom of display shape" and "separability from screen" by using the projection unit such as projector, which cannot be offered by the direct-viewing-type display apparatus, can be realized.

It is preferable that the first screen has a screen unit formed by overlapping a transparent member and a transmission type light diffusion member. In this case, the transmission type light diffusion member is disposed on the first projection surface side.

According to this structure, no problem of use environment of the apparatus occurs. Also, lowering of maintenance and production of shadows are prevented. Accordingly, a new type of image display apparatus capable of providing advantages such as “high degree of freedom of display shape” and “separability from screen” can be realized by using the projection unit.

It is preferable that the second screen is formed by overlapping a transparent member and a transmission type light diffusion member. In this case, the transmission type light diffusion member is disposed on the second projection surface side.

According to this structure, no problem of use environment of the apparatus occurs. Also, lowering of maintenance and production of shadows are prevented.

Accordingly, a new type of image display apparatus capable of providing advantages such as “high degree of freedom of display shape” and “separability from screen” can be realized by using the projection unit.

It is preferable to further include an optical path change unit which changes an optical path of a projection unit which projects at least either the projection image on the first projection surface or the projection image on the second projection surface.

According to this structure, the area for disposing the projection unit can be reduced without narrowing the projection range of the image. Thus, the area occupied by the image display system in this embodiment can be decreased by the efficient arrangement of the projection unit. Accordingly, the degree of installation freedom can be enhanced.

It is preferable to further include a first light shield member which shields stray light leaked on the second projection surface contained in the projection image onto the first projection surface.

According to this structure, stray light leaked on the second projection surface can be shielded. Thus, the image quality of the projection image of the second screen can be enhanced.

It is preferable that the first light shield member further shields stray light leaked on the first projection surface contained in the projection image onto the second projection surface.

According to this structure, stray light leaked on the first projection surface as well as stray light leaked on the second projection surface can be shielded. Thus, the image quality of the projection image of the first screen can be further enhanced.

It is preferable to further include a second light shield member which shields stray light leaked on the first projection surface contained in the projection image onto the second projection surface.

According to this structure, stray light leaked on the first projection surface can be shielded. Thus, the image quality of the projection image of the first screen can be enhanced.

It is preferable to further include a light shield member which shields at least either stray light leaked on the second projection surface contained in the projection image onto the first projection surface, or stray light leaked on the first projection surface contained in the projection image onto the second projection surface.

According to this structure the image quality of the projection image on the first screen can be improved by shielding stray light leaked on the first projection surface, or the image quality of the projection image on the second screen can be improved by shielding stray light leaked on the second projection surface.

According to a second aspect of the invention, there is provided an image display system which displays an image as a transmitted projection image and includes the image display apparatus as any one of the described image display apparatuses, a first projection unit which projects an image on the first projection surface, a second projection unit which projects an image on the second projection surface. The first projection unit is disposed on the first projection surface side of the first screen, and the second projection unit is disposed on the second projection surface side of the second screen.

According to this structure, the image display system having high degree of shape freedom of the projection surface can be provided when the projection image is displayed by the projection unit. Moreover, the image display system capable of separating the projecting unit and the screen when the projection image is displayed by the projection unit.

According to a third aspect of the invention, there is provided an image display system which displays an image as a transmitted projection image and includes: a first screen which has a first projection surface and transmits a projection image projected on the first projection surface; a second screen which has a second projection surface and transmits a projection image projected on the second projection surface; a third screen which has a third projection surface and transmits a projection image projected on the third projection surface; and a projection unit which projects an image on the first and third projection surfaces. The first and second screens are disposed adjacent to each other such that the normal line of the first projection surface crosses the normal line of the second projection surface. The second and third screens are disposed adjacent to each other such that the normal line of the second projection surface crosses the normal line of the third projection surface. The projection unit is disposed on the first and third projection surface sides of the first and third screens.

According to a fourth aspect of the invention, there is provided an image display system which displays an image as a transmitted projection image and includes: a first screen which has a first projection surface and transmits a projection image projected on the first projection surface; a second screen which has a second projection surface and transmits a projection image projected on the second projection surface; and a projection unit which projects an image on the first and second projection surfaces. The first and second screens are disposed adjacent to each other such that the normal line of the first projection surface crosses the normal line of the second projection surface. The projection unit is disposed on the first and second projection surface sides of the first and second screens.

It is preferable that the first through third screens according to the image display system described above have structures similar to those of any one of the image display apparatuses.

According to this structure, the image display system having high degree of shape freedom of the projection surface can be provided when the projection image is displayed by the projection unit. Moreover, the image display system capable of separating the projecting unit and the screen when the projection image is displayed by the projection unit.

According to a fifth aspect of the invention, there is provided an image display system which displays an image as a transmitted projection image and includes: any one of the described image display apparatuses; and a projection unit which projects an image on the first and second projection surfaces. The projection unit is provided on the first projection surface of the first screen and the second projection surface of the second screen.

According to this structure, the image display system having high degree of shape freedom of the projection surface can be provided when the projection image is displayed by the projection unit. Moreover, the image display system capable of separating the projecting unit and the screen when the projection image is displayed by the projection unit.

It is preferable that a projection angle of a projection image to the first projection surface is equal to a projection angle of the projection unit to the second projection surface.

According to this structure, the pixel density of the projection image on the first projection surface can be matched with the pixel density of the projection image of the second projection surface. Thus, the brightness of the image of the first projection surface becomes equal to the brightness of the image of the second projection surface.

According to a sixth aspect of the invention, there is provided an image display method which displays an image as a transmitted projection image by using a first screen which has a first projection surface and transmits a projection image projected on the first projection surface, a second screen which has a second projection surface and transmits a projection image projected on the second projection surface, a third screen which has a third projection surface and transmits a projection image projected on the third projection surface. The image display method includes dividing an image to be projected on the first projection surface and an image to be projected on a third projection surface from an original image representing one image, and separately performing trapezoidal-correction for the image projected on the first projection surface and the image projected on the third projection surface, and projecting the image which performs trapezoidal-correction separately on the first projection surface and the third projection surface. The first and second screens are disposed adjacent to each other such that the normal line of the first projection surface crosses the normal line of the second projection surface. The second and third screens are disposed adjacent to each other such that the normal line of the second projection surface crosses the normal line of the third projection surface.

It is preferable that the image display method according to this aspect of the invention is applied to the image display apparatuses according to the aspects of the invention.

According to this method, the image display system having high degree of shape freedom of the projection surface can be provided when the projection image is displayed by the projection unit. Moreover, the image display system capable of separating the projecting unit and the screen when the projection image is displayed by the projection unit.

It is preferable that the tread-board of the step is the first screen, and the cross-board of the step is the second screen in the image display method.

It is preferable that the first and second screens of the image display apparatus are disposed adjacent to each other in the horizontal direction in the image display method.

It is preferable that a projection angle of a projection image to the first or third projection surface is equal to a projection angle of the projection unit to the second projection surface.

BRIEF DESCRIPTION OF THE DRAWINGS

The invention will be described with reference to the accompanying drawings, wherein like reference numbers reference like elements.

DESCRIPTION OF EXEMPLARY EMBODIMENTS

Embodiments according to the invention are hereinafter described in detail with reference to the drawings. The embodiments shown herein do not limit the scope of the appended claims of the invention in an unreasonable manner. Also, all the structures explained herein are not necessarily the essential structural requirements for the invention.

1. Principle Structure of Image Display System

An image display system according to this embodiment can include an image display apparatus, and a projection unit for projecting a projection image on the image display apparatus.

Figure 1:
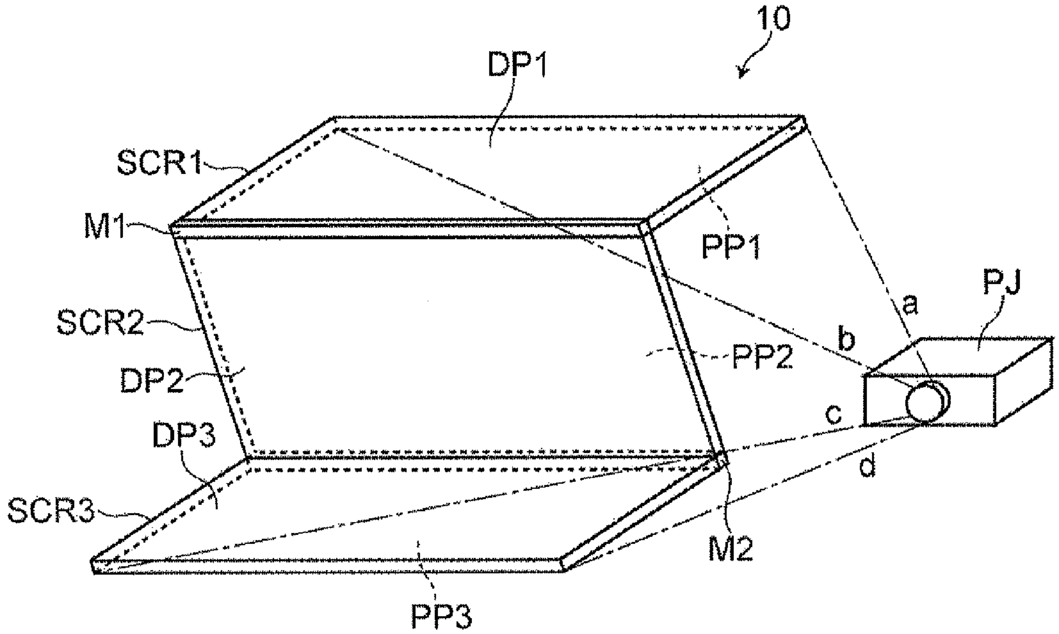
FIG. 1 schematically illustrates a principle structure of an image display apparatus in an embodiment.

FIG. 1 schematically illustrates the principle structure of the image display apparatus according to this embodiment.

An image display apparatus 10 in this embodiment displays an image as a transmitted projection image projected by a projection unit such as a projector PJ. The image display apparatus 10 include at least first and second screens SCR1 and SCR2. The first and second screens SCR1 and SCR2 are disposed adjacent to each other in predetermined directions (horizontal direction and vertical directions). As can be seen from FIG. 1, the image display apparatus 10 further includes a component M1, and one side of the first screen SCR1 and one side of the second screen SCR2 disposed adjacent to each other contact the component M1.

The first screen SCR1 having a first projection surface PP1 is a transmission type screen which transmits a projection image projected by the projector PJ. That is, in case of the first screen SCR1, the projection image projected by the projector PJ is transmitted through a first display surface DP1 and displayed thereon as the back surface of the first projection surface PP1.

The second screen SCR2 having a second projection surface PP2 is a transmission type screen which transmits a projection image projected by the projector PJ. That is, in case of the second screen SCR2, the projection image projected by the projector PJ is transmitted through a second display surface DP2 and displayed thereon as the back surface of the second projection surface PP2.

The image display apparatus 10 can further include a third screen SCR3. The second and third screens SCR2 and SCR3 are disposed adjacent to each other. As can be seen from FIG. 1, the image display apparatus 10 further include a component M2, and one side of the second screen SCR2 and one side of the third screen SCR3 disposed adjacent to each other contact the component M2. The third screen SCR3 having a third projection surface PP3 is a transmission type screen which transmits the projection image projected by the projector PJ of the third projection surface PP3. That is, in case of the third screen SCR3, the projection image projected by the projector PJ is transmitted through a third display surface DP3 and displayed thereon as the back surface of the third projection surface PP3.

According to the image display apparatus 10 illustrated in FIG. 1, the three screens are disposed adjacent to one another in order. However, four or more screens sequentially disposed adjacent to one another may be included in the image display device 10.

Figure 2:
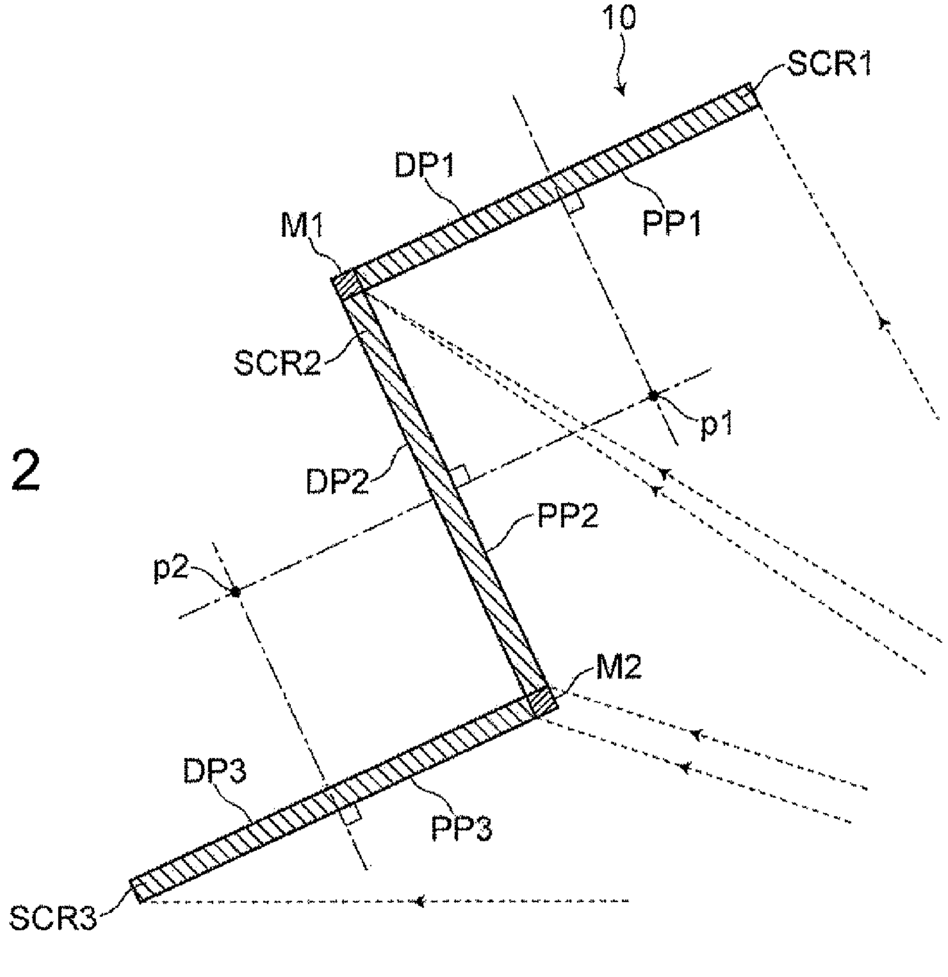
FIG. 2 schematically illustrates a cross-sectional structure of the image display apparatus shown in FIG. 1.

FIG. 2 schematically illustrates a cross-sectional structure of the image display apparatus 10 shown in FIG. 1. In FIG. 2, similar reference numbers are given to parts and elements similar to those in shown in FIG. 1, and the same explanation is not repeated.

The first and second screens SCR1 and SCR2 of the image display apparatus 10 shown in FIG. 1 are disposed adjacent to each other such that the normal line of the first projection surface PP1 and the normal line of the projection surface PP2 cross each other. In FIG. 2, the position of a cross point p1 of the normal lines of the first and second projection surfaces PP1 and PP2 exists on the first and second projection surfaces PP1 and PP2 side with respect to the first and second screens SCR1 and SCR2. However, the cross point p1 may be located on the first and second display surfaces DP1 and DP2 side with respect to the first and second screens SCR1 and SCR2.

By this arrangement, a new type of image display apparatus capable of providing advantages such as "high degree of freedom of display shape" and "separability from screen" by using the projection unit such as projector, which cannot be offered by the direct-viewing-type display apparatus, can be realized.

When the image display apparatus 10 further includes the third screen SCR3, the second and third screens SCR2 and SCR3 can be similarly disposed adjacent to each other such that the normal line of the second projection surface PP2 and the normal line of the third projection surface PP3 cross each other. In FIG. 2, the position of a cross point p2 of the normal lines of the second and third projection surfaces PP2 and PP3 exists on the second and third display surfaces DP2 and DP3 side with respect to the second and third screens SCR2 and SCR3. However, the cross point p2 may be located on the second and third projection surfaces PP2 and PP3 side with respect to the second and third screens SCR2 and SCR3.

While projection images are projected on the first through third screens SCR1 through SCR3 by using one projector PJ in FIG. 1, projection images different for each screen or a projection image expanding at least on two screens may be projected on the first through third screens SCR1 through SCR3 by using two or three projectors.

Accordingly, an image display system for displaying images as transmitted projection images can include the image display apparatus 10, the first projector as the first projection unit for projecting an image on the first projection surface PP1, and the second projector as the second projection unit for projecting an image on the second projection surface PP2. In this case, the first projector is disposed on the first projection surface PP1 side of the first screen SCR1, and the second projector is disposed on the second projection surface PP2 side of the second screen SCR2.

Also, an image display system for displaying images as transmitted projection images can include the first screen SCR1 having the first projection surface PP1 and transmitting a projection image on the first projection surface PP1, the second screen SCR2 having the second projection surface PP2 and transmitting a projection image on the second projection surface PP2, the third screen SCR3 having the third projection surface PP3 and transmitting a projection image on the third projection surface PP3, and a projector as a projection unit for projecting images on the first and third projection surfaces PP1 and PP3. In this case, the first and second screens SCR1 and SCR2 are disposed adjacent to each other such that the normal lines of the first and second projection surfaces PP1 and PP2 cross each other. Also, the second and third screens SCR2 and SCR3 are disposed adjacent to each other such that the normal lines of the second and third projection surfaces PP2 and PP3 cross each other. The projector is disposed on the first through third projection surfaces PP1 through PP3 side of the first through third screens SCR1 through SCR3.

Alternatively, an image display system for displaying images as transmitted projection images can include the image display apparatus 10, and a projector as a projection unit for projecting images on the first and second projection surfaces PP1 and PP2. In this case, the projector is disposed on the first and second projection surfaces PP1 and PP2 side of the first and second screens SCR1 and SCR2.

Accordingly, the image display apparatus 10 in this embodiment provides advantages such as "high degree of freedom of display shape" and "separability from screen", and thus can be used for various purposes by varying the direction of disposition of the two screens provided adjacent to each other, for example.

2. Applicability

Figure 3:
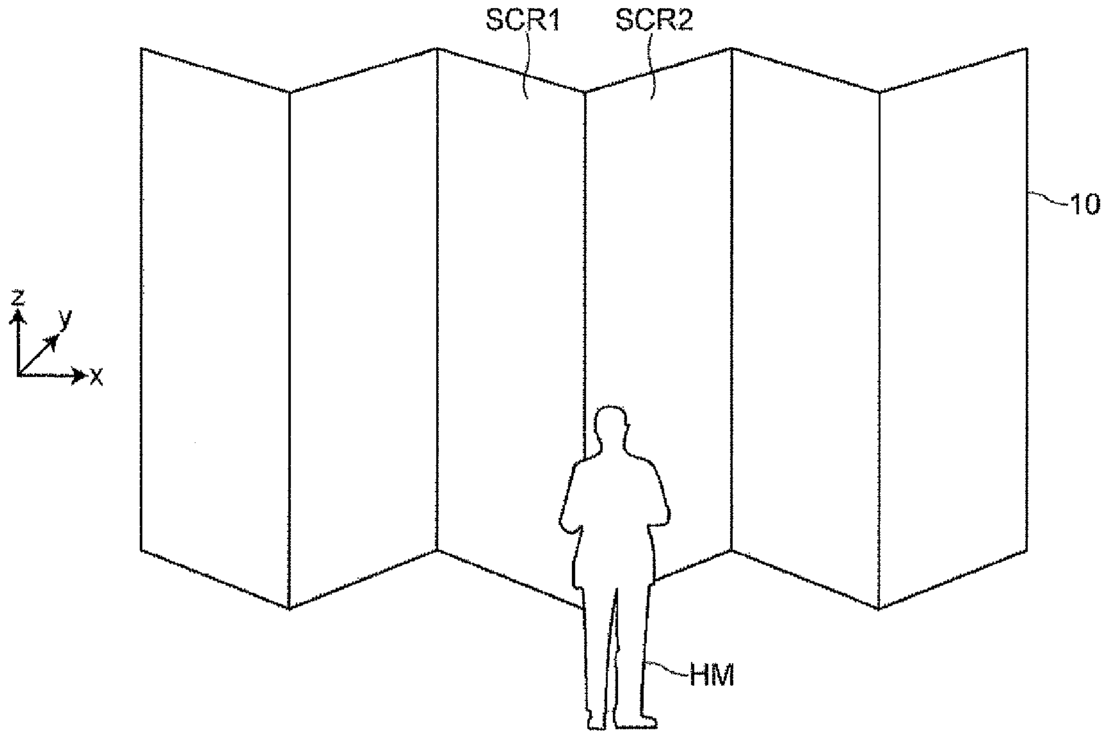
FIG. 3 schematically illustrates a first application example of the image display apparatus according to the embodiment.

FIG. 3 schematically illustrates a first example of the image display apparatus 10 according to this embodiment of the invention.

In FIG. 3, x axis is a predetermined horizontal direction, and y axis is a depth direction orthogonal to the x axis. An observer HM stands on the x-y plane and observes the display surface of the image display apparatus 10 in the embodiment. In the image display apparatus 10, a plurality of screens containing the first and second screens SCR1 and SCR2 shown in FIG. 1 are disposed adjacent to one another in the horizontal direction. More specifically, the plural screens are disposed such that one side of one screen contacts one side of another screen in z axis direction as the vertical direction orthogonal to the x-y plane shown in FIG. 3.

In this structure, a projection image projected by a not-shown projection unit onto a projection surface on the back surface of the image display apparatus 10 shown in FIG. 3 passes through the display surface, and the observer HM observes this image on the display surface. According to the image display apparatus shown in FIG. 3, a new type of image display apparatus capable of providing advantages such as “high degree of freedom of display shape” and “separability from screen” by using the projection unit such as projector, which cannot be offered by the direct-viewing-type display apparatus, can be realized.

Figure 4:
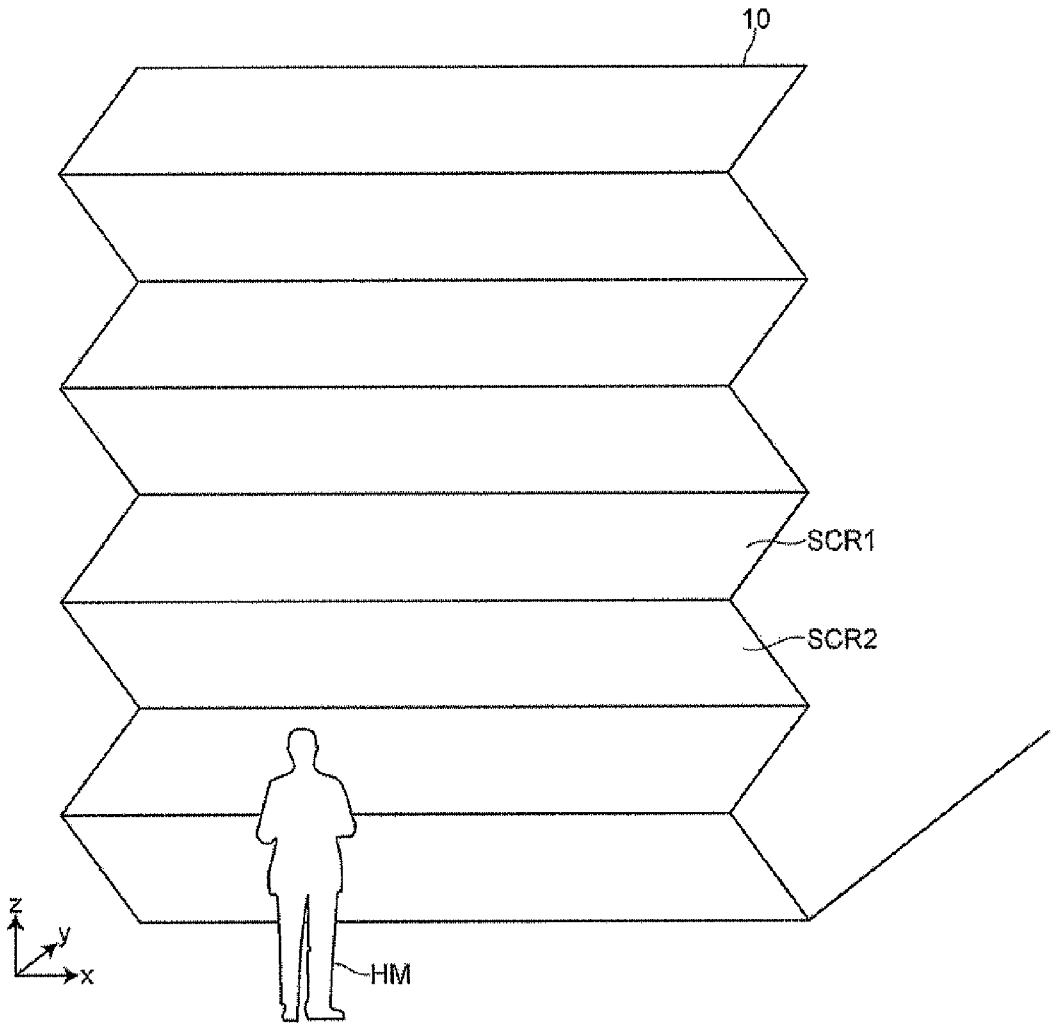
FIG. 4 schematically illustrates a second application example of the image display apparatus according to the embodiment.

FIG. 4 schematically illustrates a second example of the image display apparatus 10 according to this embodiment of the invention.

In FIG. 4, x axis is a predetermined horizontal direction, and y axis is a depth direction orthogonal to the x axis. The observer HM stands on the x-y plane and observes the display surface of the image display apparatus 10 in the embodiment. In the image display apparatus 10, a plurality of screens containing the first and second screens SCR1 and SCR2 shown in FIG. 1 are disposed adjacent to one another in the vertical direction. More specifically, the plural screens are disposed such that one side of one screen contacts one side of another screen in the x axis direction shown in FIG. 4.

In this structure, a projection image projected by a not-shown projection unit onto a projection surface on the back surface of the image display apparatus 10 shown in FIG. 4 passes through the display surface, and the observer HM observes this image on the display surface. According to the image display apparatus shown in FIG. 4, a new type of image display apparatus capable of providing advantages such as “high degree of freedom of display shape” and “separability from screen” by using the projection unit such as projector, which cannot be offered by the direct-viewing-type display apparatus, can be realized.

Figure 5:
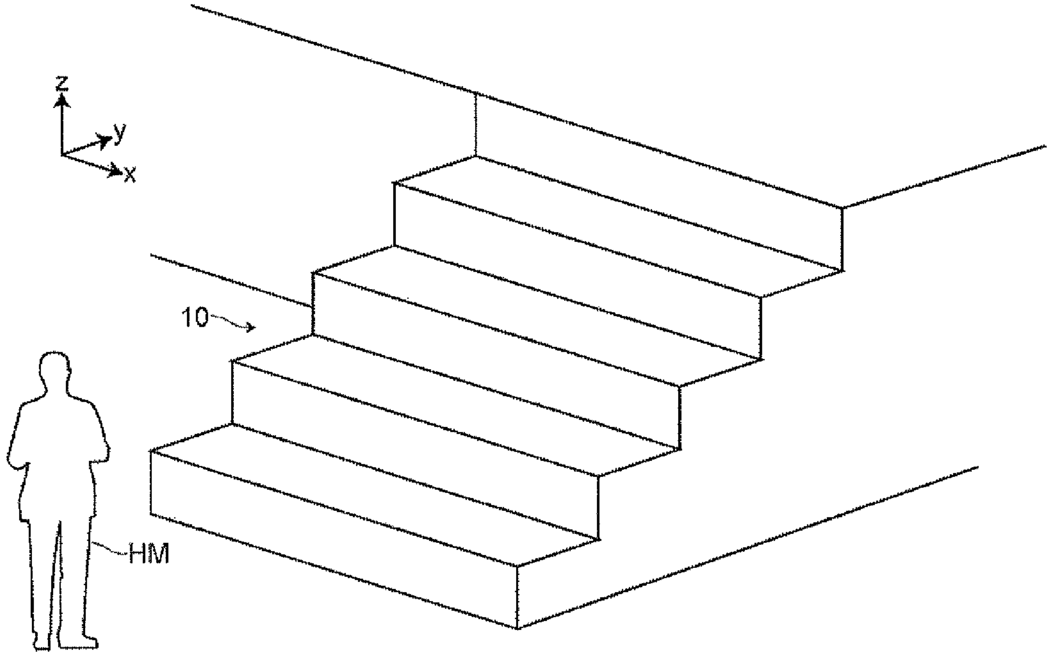
FIG. 5 schematically illustrates a third application example of the image display apparatus according to the embodiment.

FIG. 5 schematically illustrates a third example of the image display apparatus 10 according to this embodiment of the invention.

The third example is one example of the second example shown in FIG. 4, and the image display apparatus 10 in this embodiment is applied to the step equipped on a building. In FIG. 5, x axis is a predetermined horizontal direction, and y axis is a depth direction orthogonal to the x axis. The observer HM stands on the x-y plane and observes the display surface of the image display apparatus 10 in the embodiment. In the image display apparatus 10, a plurality of screens containing the first and second screens SCR1 and SCR2 shown in FIG. 1 are disposed adjacent to one another in the vertical direction. More specifically, the plural screens are disposed such that one side of one screen contacts one side of another screen in the x axis direction shown in FIG. 5.

Figure 6:
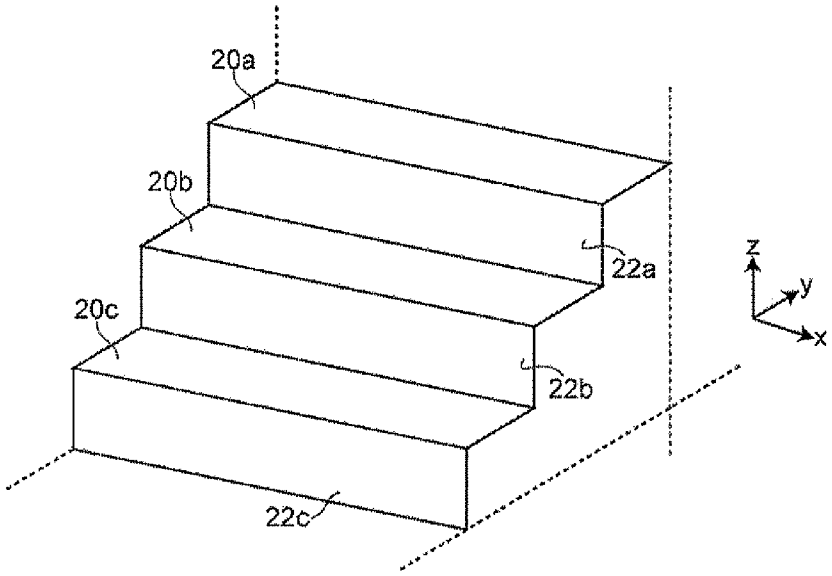
FIG. 6 schematically illustrates a part of a step shown in FIG. 5.

FIG. 6 schematically illustrates a part of the step shown in FIG. 5.

The step of the building includes tread-board (tread-plates) 20*a*, 20*b*, and 20*c* on which a human going upstairs and downstairs puts his/her feet, and cross-boards (cross-plates) 22*a*, 22*b*, and 22*c* disposed to cross the tread-boards 20*a* through 20*c*. Both ends of the tread-plates 20*a*, 20*b*, and 20*c* are fixed to a wall or the like of the building. Similarly, both ends of the cross-boards 22*a*, 22*b*, and 22*c* are fixed to a wall or the like of the building.

When the image display apparatus 10 in this embodiment is applied to the step of the building shown in FIG. 6, the first screen SCR1 is provided such that the image as the projection image transmitted through the first projection surface can be displayed on the tread-board 20*a* of the step, for example. Thus, the tread-board 20*a* corresponds to the first screen SCR1. In FIG. 6, a screen similar to that of the tread-board 20*a* is provided on each of the tread-boards 20*b* and 20*c* of the step. In addition, the second screen SCR2 is provided such that the image as the projection image transmitted through the second projection surface can be displayed on the cross-board 22*a* of the step, for example. Thus, the cross-board 22*a* corresponds to the second screen SCR2. In FIG. 6, a screen similar to that of the cross-board 22*a* is provided on each of the cross-boards 22*b* and 22*c* of the step. That is, the tread-board 20*a* functions as the first screen SCR1 in FIG. 1, the cross-board 22*a* functions as the second screen SCR2 in FIG. 1, and the tread-board 20*b* functions as the third screen SCR3 shown in FIG. 1. Also, a projector as the projection unit for projecting the projection images on the projection surfaces of cross-board and tread-board is provided inside the step. In this case, the projector projects projection images on the plural cross-boards, projects projection images on the plural tread-boards, and projects projection images on the plural cross-boards and plural tread-boards. Thus, an image display apparatus capable of achieving a new type of signage can be realized by using the image display apparatus 10 having this structure.

In case of a step of a building, there is an alternative method which affixes direct-view-type small liquid crystal panels on the area corresponding to the step, or a structure which disposes display device having LED and transparent protection cover thereon. According to these methods, however, there is a possibility that the use environment of the apparatus is subject to dust, water, or other dangerous material, or physical external force. In this case, preferable period of life and normal operation of the apparatus cannot be offered. Moreover, wiring for supplying signals, and maintenance for replacement at the time of failure are difficult.

Alternatively, there is a method of projecting images from above to display picture images and information on the walking floor by using lighting units or the like. In this case, a shadow is produced by passerby.

According to the image forming apparatus shown in FIG. 6, however, no problem of use environment of the apparatus occurs. Also, lowering of maintenance and production of shadows are prevented. Accordingly, a new type of image display apparatus capable of providing advantages such as “high degree of freedom of display shape” and “separability from screen” can be realized by using the projection unit such as projector.

3. Detailed Explanation

The step according to this embodiment applied to steps equipped on buildings shown in FIGS. 5 and 6 are now described in detail. Obviously, the step is similarly applicable to the image display apparatuses according to the examples shown in FIGS. 3 and 4.

Figure 7:
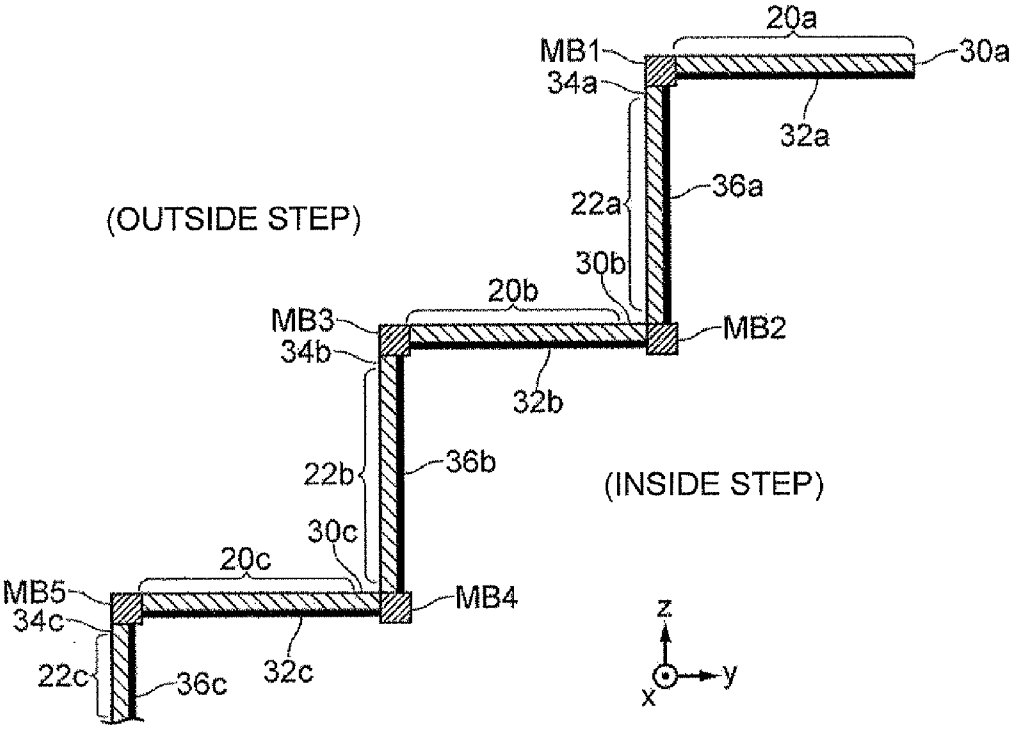
FIG. 7 schematically illustrates a cross-sectional structure of the step shown in FIG. 6.

FIG. 7 schematically illustrates a cross-sectional structure of the step shown in FIG. 6. In FIG. 7, similar reference numbers are given to parts and elements similar to those shown in FIG. 6, and the same explanation is not repeated. FIG. 7 is a cross-section of the predetermined y-z plan view of the step shown in FIG. 6 in the predetermined x axis.

It is assumed herein that the tread-board 20*a*, the cross-board 22*a*, and the tread-board 20*b* shown in FIG. 7 correspond to the first screen SCR1, the second screen SCR2, and the third screen SCR3 shown in FIG. 1, respectively.

The tread-board 20*a* and the cross-board 22*a* are supported by a member MB1 as a support member. The cross-board 22*a* and the tread board 20*b* are supported by a member MB2 as a support member. The tread-board 20*b* and the cross-board 22*b* are supported by a component MB3 as a support member. The cross-board 22*b* and the tread-board 20*c* are supported by a component MB4 as a support member. The tread-board 20*c* and the cross-board 22*c* are supported by a member MB5 as a support member. Both ends of each of the members MB1 through MB5 are fixed to a wall or the like of the building, for example.

The tread-boards 20*a*, 20*b*, and 20*c* (first screen in a wide sense) are constituted by screen members formed by overlapping transparent member and transmission type light diffusion member. For example, the tread-board 20*a* is constituted by a screen member formed by overlapping the transparent member 30*a* and the transmission type light diffusion member 32*a*. More specifically, a transmission type light diffusion member 32*a* is disposed on the first projection surface PP1 side (inside of the step where the projector is positioned), and a transparent member 30*a* is disposed on the display surface side (outside of the step). Similarly, the tread-board 20*b* is constituted by a screen member formed by overlapping the transparent member 30*b* and the transmission type light diffusing member 32*b*. More specifically, the transmission type light diffusing member 32*b* is disposed on the first projection surface PP1 side (inside of the step where the projector is positioned), and the transparent member 30*b* is disposed on the display surface side (outside of the step). Also, the tread-board 20*c* is constituted by a screen member formed by overlapping the transparent member 30*c* and the transmission type light diffusion member 32*c*. More specifically, the transmission type light diffusing member 32*c* is disposed on the first projection surface PP1 side (inside of the step where the projector is positioned), and the transparent member 30*c* is disposed on the display surface side (outside of the step).

Each of the cross-boards 22*a*, 22*b*, and 22*c* (second screens in a wide sense) may be similarly constituted by a screen unit formed by overlapping a transparent member and a transmission type light diffusion member. For example, the cross-board 22*a* is constituted by a screen member formed by overlapping a transparent member 34*a* and a transmission type light diffusion member 36*a*. More specifically, a transmission type light diffusion member 36*a* is disposed on the first projection surface PP1 side (inside of the step where the projector is positioned), and a transparent member 34*a* is disposed on the display surface side (outside of the step). Similarly, the cross-board 22*b* is constituted by a screen member formed by overlapping the transparent member 34*b* and the transmission type light diffusing member 36*b*. More specifically, the transmission type light diffusing member 36*b* is disposed on the first projection surface PP1 side (inside of the step where the projector is positioned), and the transparent member 34*b* is disposed on the display surface side (outside of the step). Also, the cross-board 22*c* is constituted by a screen member formed by overlapping the transparent member 34*c* and the transmission type light diffusion member 36*c*. More specifically, the transmission type light diffusing member 36*c* is disposed on the first projection surface PP1 side (inside of the step where the projector is positioned), and the transparent member 34*c* is disposed on the display surface side (outside of the step).

In FIG. 7, the transparent members 30*a*, 30*b*, 30*c*, 34*a*, 34*b*, and 34*c* are made of tempered glass, acrylic, polycarbonate, and the like. Also, in FIG. 7, the transmission type light diffusion members 32*a*, 32*b*, 32*c*, 36*a*, 36*b*, and 36*c* are constituted by film-shaped, plate-shaped, or paper-shaped transmission type projector screens or the like.

In this structure, the effects of temperature and humidity variations and pressure fluctuations produced by the human tread on the tread board are not imposed on the transmission type light diffusion members which cost higher than the transparent members. In this case, cost increase of the image display apparatus applied to the step is further prevented. Thus, the image display apparatus of the type which cannot be realized by a past direct-vision-type display apparatus can be provided at low cost.

Moreover, the light source is not required for each tread-board of the step. Thus, cost and labor for installation can be reduced. Further, the light source is not required for each cross-board of the step. Thus, cost and labor for installation can be reduced.

3.1 Arrangement of Projector

Figure 8:
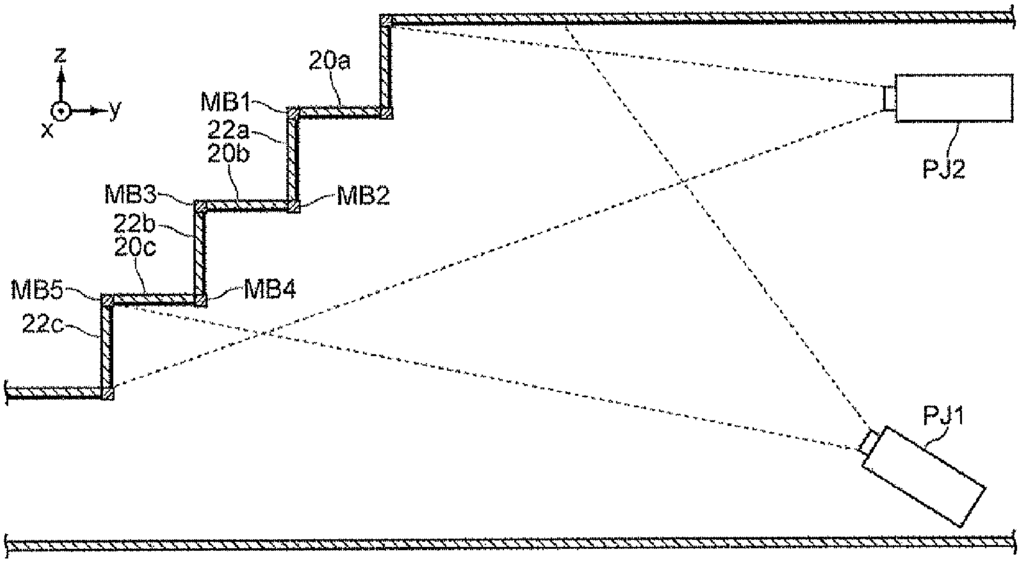
FIG. 8 illustrates a structure example of an image display system in the embodiment including a projector disposed inside the step shown in FIG. 6 or 7.

FIG. 8 illustrates a structure example of an image display system in this embodiment including the projector disposed inside the step shown in FIG. 6 or 7. In FIG. 8, similar reference numbers are given to parts and elements similar to those in FIG. 7, and the same explanation is not repeated. FIG. 8 is a cross-section of the y-z plane of the step shown in FIG. 6 in the predetermined x axis.

In FIG. 8, a first projector PJ1 for projecting a projection image on the projection surfaces on the plural tread-boards of the step containing the tread-boards 20*a*, 20*b* and 20*c* is provided inside the step. Also, a second projector PJ2 for projecting a projection image on the projection surfaces of the plural cross-boards of the step containing the cross-boards 22*a*, 22*b* and 22*c* is provided inside the step.

As can be seen from FIG. 8, a space for disposing two projectors are required in the inside area of the step. Thus, there is a possibility that the area to be occupied by the image display system increases. In this case, it is preferable that at least the first projector PJ1 or the second projector PJ2 further has an optical path change unit for changing the optical path of the projection image to be projected (optical path change unit for changing the optical path of the projection unit for projecting the projection image on at least one of the first and second projection surfaces).

Figure 9:
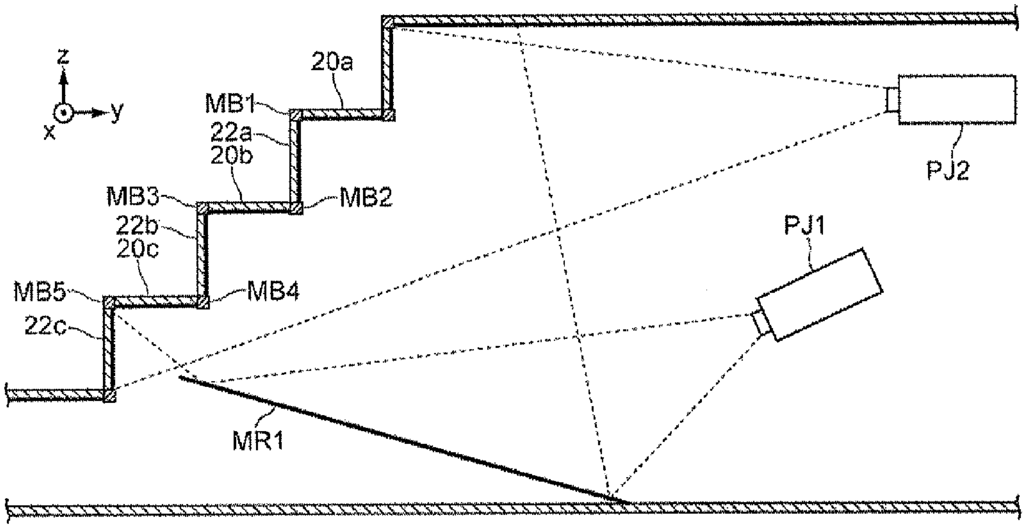
FIG. 9 illustrates an example of an optical path change unit included in an image display system according to the embodiment.

FIG. 9 illustrates an example of the optical path change unit included in the image display system in this embodiment. In FIG. 9, similar reference numbers are given to parts and elements similar to those in FIG. 8, and the same explanation is not repeated.

As illustrated in FIG. 9, a surface reflection mirror MR1 as an optical path change unit is provided in the space inside the step. The surface reflection mirror MR1 bends the optical path of the projection image of the first projector PJ1. The projection image of the first projector PJ1 whose optical path has been bent by surface reflection mirror MR1 is projected on the plural tread-boards of the step containing the tread-boards 20*a*, 20*b* and 20*c*. According to the structure shown in FIG. 9, the space for disposing the first and second projectors PJ1 and PJ2 can be reduced in the z axis direction. Thus, the area occupied by the image display system in this embodiment can be decreased by the efficient arrangement of the projector.

While the surface reflection mirror MR1 bends the optical path of the projection image of the first projector PJ1 in FIG. 9, the surface reflection mirror MR1 may bend the optical path of the projection image of the second projector PJ2.

Alternatively, each of the first and second projectors PJ1 and PJ2 may have a surface reflection mirror such that each of the surface reflection mirrors can bend the optical path of the projection image of the corresponding projector.

While the surface reflection mirror is used as the optical change unit in FIG. 9, the invention is not limited to this. The optical change unit may be other types as long as they can change the optical path of the projector.

It is preferable that the projector is disposed such that the projection angle of the projector to the tread-boards of the step becomes equal to the projection angle of the projector to the cross-boards of the step.

Figure 10:
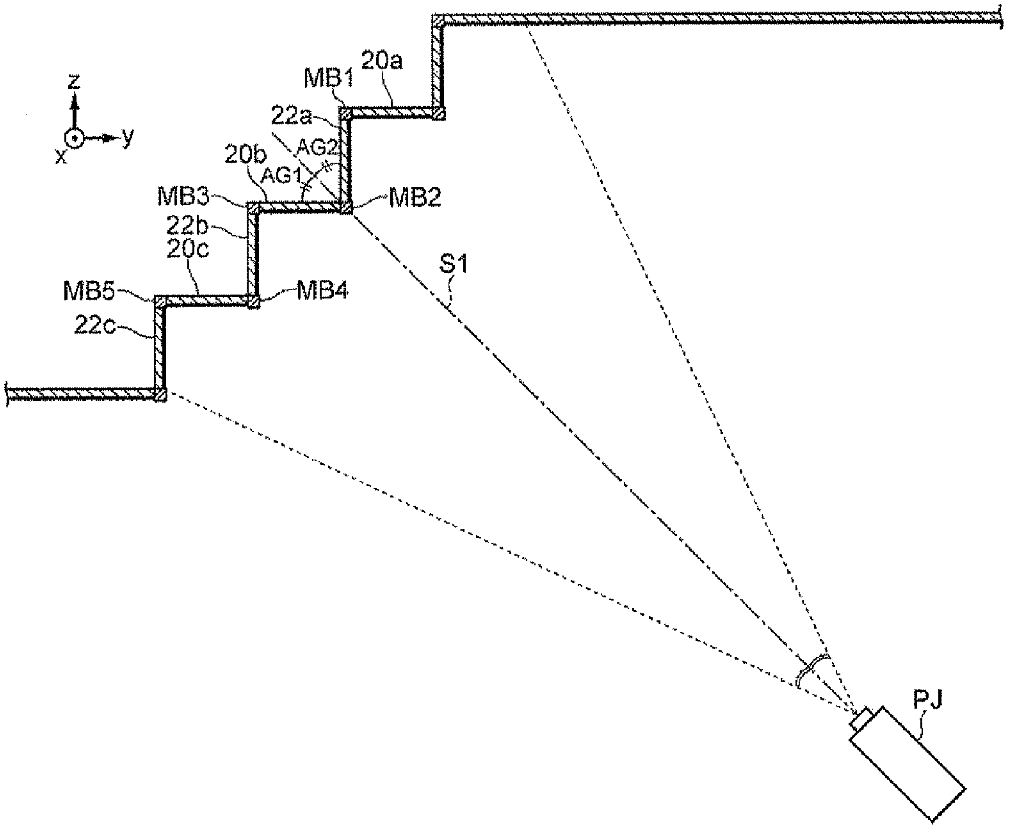
FIG. 10 schematically illustrates a projection angle of a projector of the image display system in the embodiment.

FIG. 10 schematically illustrates the projection angle of the projector in the image display system according to this embodiment. In FIG. 10, similar reference numbers are given to parts and elements similar to those in FIG. 8 or FIG. 9 and the same explanation is not repeated.

While the first projector PJ1 for the tread-board of the step and the second projector PJ2 for the cross-board of the step are provided in FIGS. 8 and 9, a common projector PJ for both the tread-board and cross-board is provided in FIG. 10. In this case, an angle AG1 formed by a bisector S1 of the entire projection angle of the projector PJ and the tread-board is equivalent to an angle AG2 formed by the bisector S1 and the cross-board. As illustrated in FIGS. 8 and 9, when the first projector PJ1 for the tread-board of the step and the second projector PJ2 for the cross-board of the step are provided, it is preferable that the angle formed by the bisector (optical axis) of the entire projection angle of the first projector PJ3 and the tread-board is equal to the angle formed by the bisector (optical axis) of the entire projection angle of the second projector PJ2 and the cross-board.

In this structure, the pixel density of the projection image on the tread-board can be matched with the pixel density of the projection image of the cross-board. Thus, the brightness of the image of the tread-board becomes equal to the brightness of the image of the cross-board.

In the example which uses a step as an image display apparatus, it is considered that the possibility of observing an image on the cross-board is higher than the possibility of observing an image on the tread-board by the observer. In this case, the pixel density of the projection image on the cross-board becomes higher than the pixel density of the projection image on the tread-board by disposing the projector such that the angle AG1 is smaller than the angle AG2. As a result, the image on the cross-board becomes brighter.

While the structure shown in FIG. 10 does not include the optical path change unit, it is desirable that the projector is disposed such that the projection angle of the projector to the tread-board of the step becomes equivalent to the projection angle of the projector to the cross-board of the step even in the structure containing the optical path change unit similarly to the example in FIG. 10.

Figure 11:
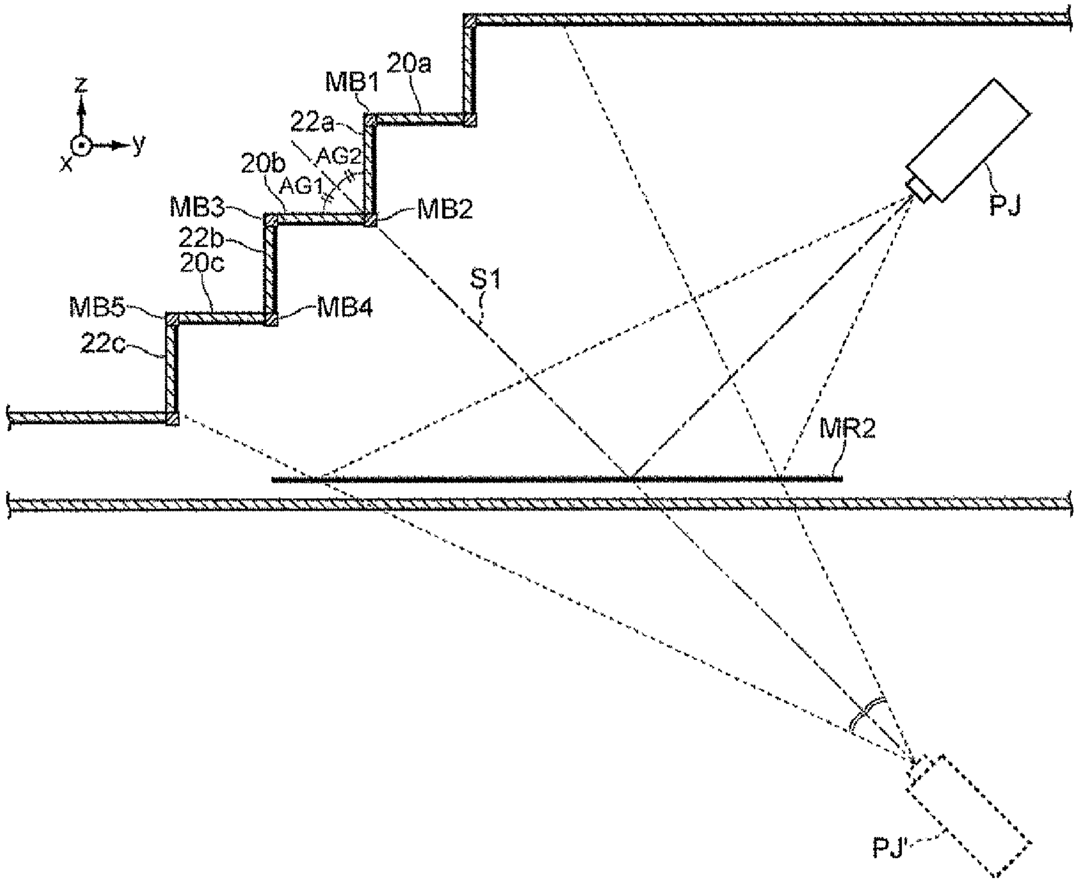
FIG. 11 schematically illustrates a projection angle of a projector of another image display system in the embodiment.

FIG. 11 schematically illustrates a projection angle of a projector in another image display system according to this embodiment. In FIG. 11, similar reference numbers are given to parts and elements similar to those in FIG. 10, and the same explanation is not repeated.

As illustrated in FIG. 11, the surface reflection mirror MR2 as the optical path change unit is disposed in parallel with the floor flat surface inside the space of the step, for example. In this case, the projection image of the projector PJ whose optical path has been changed by the surface reflection mirror MR2 is projected on the plural tread-boards and plural cross-boards of the step. In this structure, the projector PJ is disposed such that the angle AG1 formed by the tread-board and the bisector S1 of the entire projection angle of a virtual projector PJ' located at a mirror reflection conversion from the surface reflection mirror MR2 becomes equal to the angle AG2 formed by the cross-board and the bisector S1.

In this arrangement, the pixel density of the projection image on the tread-board can be matched with the pixel density of the projection image of the cross-board. Thus, the brightness of the image of the tread-board becomes equal to the brightness of the image of the cross-board.

In the example which uses a step as an image display apparatus as illustrated in FIG. 11, it is considered that the possibility of observing an image on the cross-board is higher than the possibility of observing an image on the tread-board by the observer. In this case, the pixel density of the projection image on the cross-board becomes higher than the pixel density of the projection image on the tread-board by disposing the projector PJ such that the angle AG1 is smaller than the angle AG2. As a result, the image on the cross-board becomes brighter.

3.2 Light Shield Member

It is preferable that the image display apparatus 10 having this structure farther includes a light shield member to be described below so as to improve image quality.

Figure 12:
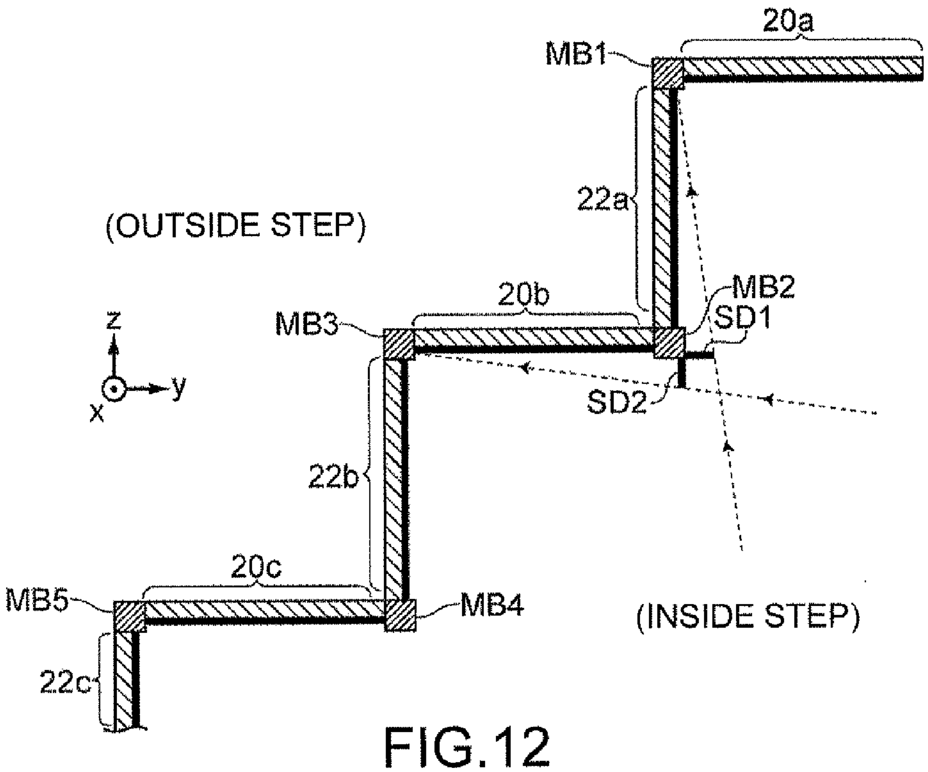
FIG. 12 illustrates light shield members included in the image display apparatus in this embodiment.

FIG. 12 illustrates a light shield member included in the image display apparatus 10 in this embodiment. In FIG. 12, similar reference numbers are given to parts and elements similar to those in FIG. 7, and the same explanation is not repeated. As illustrated in FIG. 12, the first projector PJ1 for tread-boards and the second projector PJ2 for cross-boards of the step are provided as the examples in FIGS. 8 and 9.

In this case, light of the projection image of the first projector PJ1 becomes stray light leaked onto the cross-boards other than the target tread-board, and thus deteriorates the image quality of the projection image on the cross-board. According to this embodiment, therefore, it is preferable that a first light shield member which shields stray light leaked to the second projection surface contained in the projection image onto the first projection surface. As illustrated in FIG. 12, the first light shield member SD1 is attached to the member MB2 so as to shield stray light leaked onto the cross-board 22*a* contained in the light of the projection image on the projection surface of the tread-board 20*a* projected from the first projector PJ1.

Moreover, light of the projection image of the second projector PJ2 becomes stray light leaked onto the tread-boards other than the target cross-board, and thus deteriorates the image quality of the projection image on the tread-board. According to this embodiment, therefore, it is preferable that a second light shield member which shields stray light leaked to the first projection surface contained in the light of the projection image onto the second projection surface. As illustrated in FIG. 12, the second light shield member SD2 is attached to the member MB2 so as to shield stray light leaked onto the tread-board 20*b* contained in the light of the projection image on the projection surface of the cross-board 22*b* projected from the second projector PJ2.

Accordingly, unnecessary image is not projected on the tread-boards and cross-boards of the step, and thus image quality of the display image on the respective surfaces can be improved by a simple structure.

Figure 13:
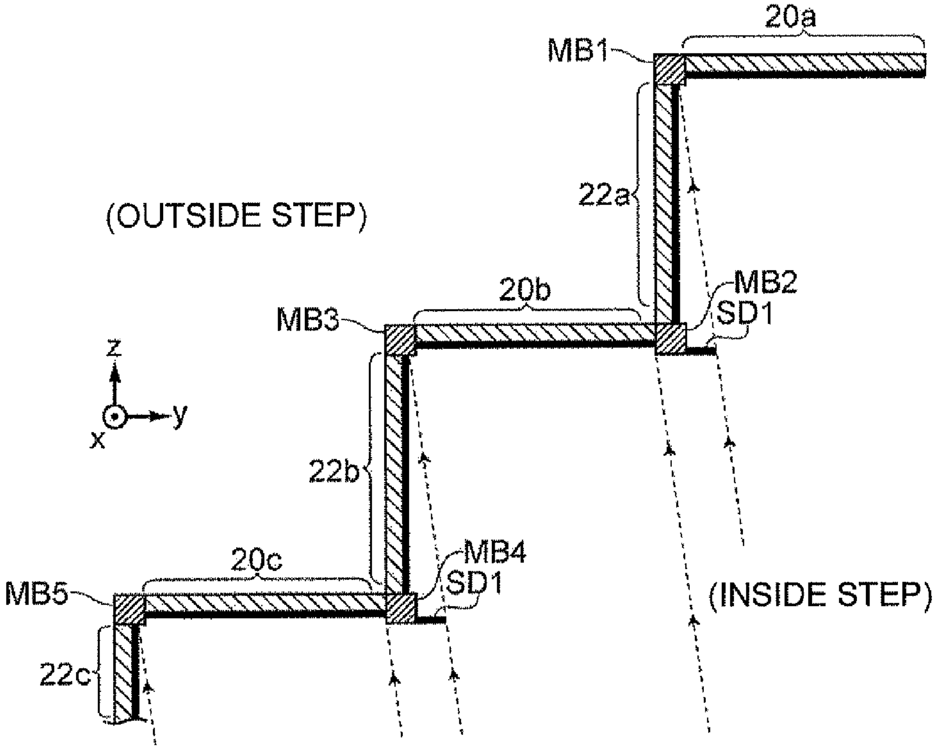
FIG. 13 illustrates a first light shield member shown in FIG. 12.

FIG. 13 illustrates the first light shield member shown in FIG. 12. In FIG. 13, similar reference numbers are given to parts and elements similar to those in FIGS. 8 and 9, and the same explanation is not repeated.

As illustrated in FIG. 13, the first light shield member shown in FIG. 12 is not required to be equipped on all the components. The first light shield member may be provided only on the component closer to the first projector PJ1 of both the components for supporting the cross-board as the shield target of stray light from the first projector PJ1. In the structure shown in FIG. 13, therefore, it is preferable that the first light shield members are provided only members MB2 and MB4 of members MB1 through MB5 to shield stray lights to the cross-boards 22*a* and 22*b*.

Figure 14:
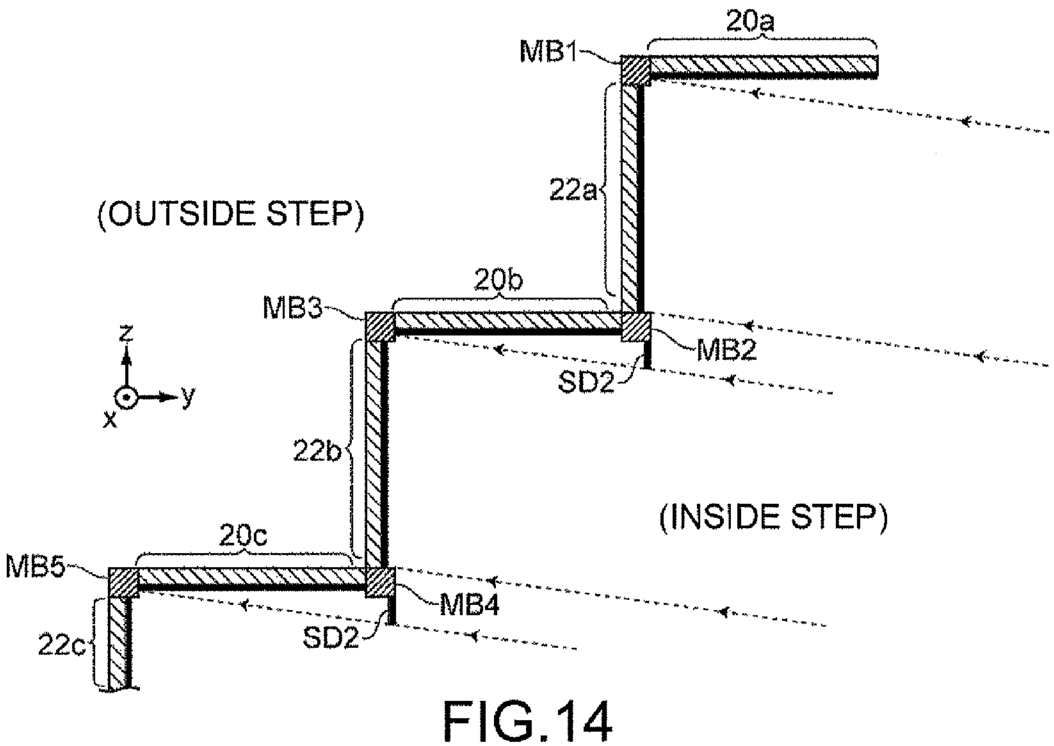
FIG. 14 illustrates a second light shield member shown in FIG. 12.

FIG. 14 illustrates the second light shielding member shown in FIG. 12. In FIG. 14, similar reference numbers are given to parts and elements similar to those in FIGS. 8 and 9, and the same explanation is not repeated.

As illustrated in FIG. 14, the second light shield member shown in FIG. 12 is not required to be equipped on all the components. The second light shield member may be provided only on the component closer to the second projector PJ2 of both the components for supporting the tread-board as the shield target of stray light from the second projector PJ2. In the structure shown in FIG. 14, therefore, it is preferable that the second light shield members are provided only members MB2 and MB4 of members MB1 through MB5 to shield stray lights to the tread-boards 20*b* and 20*c*.

Figure 15:
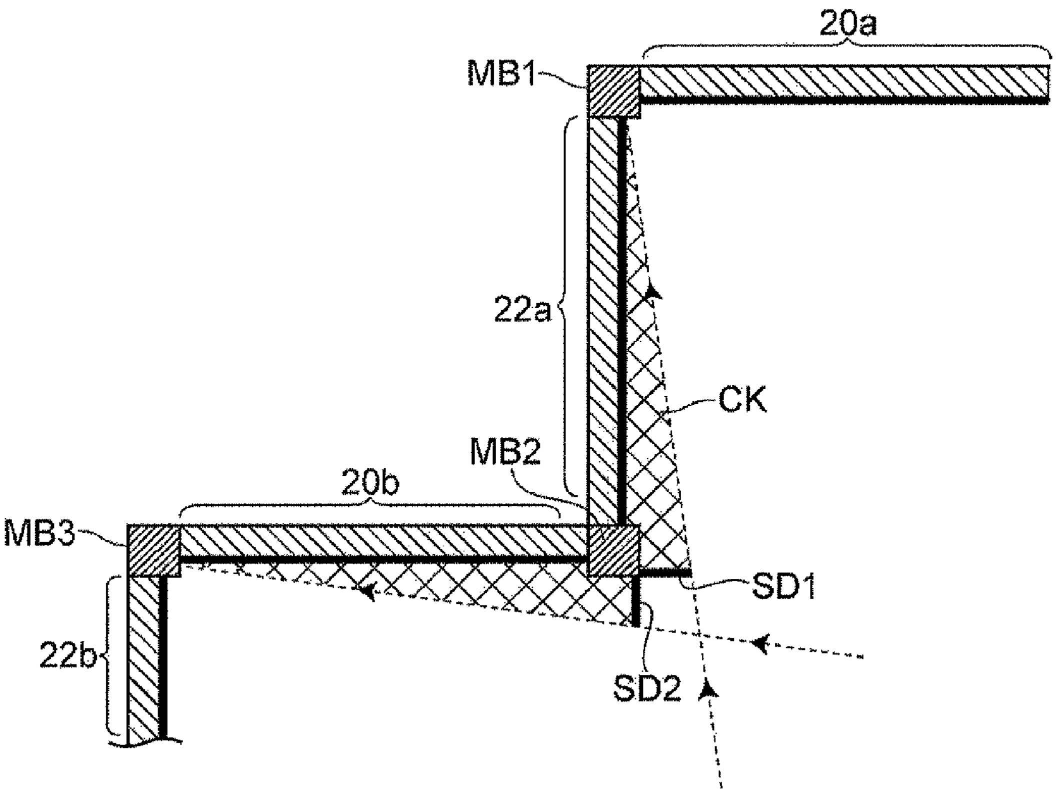
FIG. 15 illustrates an effect of the first and second light shield members.

FIG. 15 illustrates the effect of the first and second light shield members. In FIG. 15, similar reference numbers are given to parts and elements similar to those in FIG. 12, and the same explanation is not repeated.

In FIG. 15, only the first and second light shield members provided on the members MB2 are shown, but the first and second light shield members provided on the other members are similarly provided. Thus, the first and second light shielding members SD1 and SD2 attached to the member MB2 shield stray light at a shadowed portion CK on the cross-board 22*a* and the tread-board 20*b* shown in FIG. 15.

According to the examples shown in FIGS. 12 through 15, the first and second light shield members SD1 and SD2 block stray light leaked onto the first and second projection surfaces. However, the first light shield member SD1 may shield stray light leaked to the first projection surface contained in the light of the projection image to the second projection surface, for example. That is, one light shield member may function as both the first and second light shield members SD1 and SD2.

Figure 16:
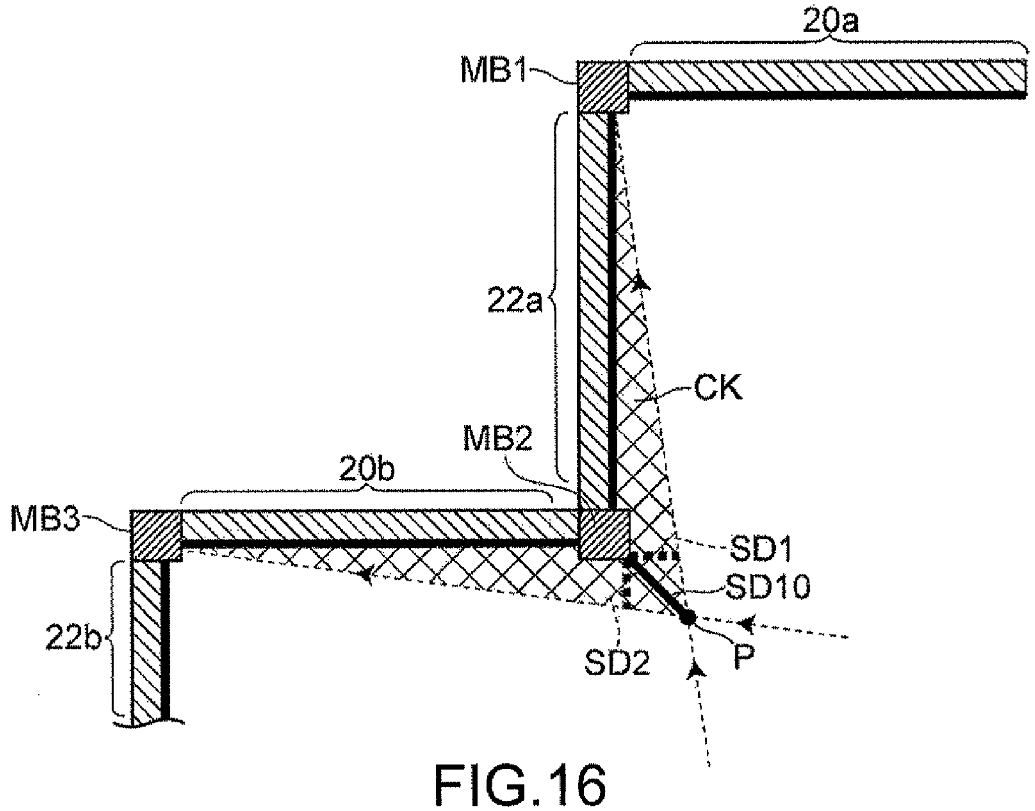
FIG. 16 illustrates a light shield member having both functions.

FIG. 16 illustrates the light shield member functioning as both the light shield members SD1 and SD2. In FIG. 16, similar reference numbers are given to parts and elements similar to those in FIGS. 12 through 15, and the same explanation is not repeated.

In the structure shown in FIG. 16, a light shield member SD10 having the function of both the first and second light shield members SD1 and SD2 is provided on the member MB2. More specifically, the light shield member SD10 is disposed on the member MB2 such that the end of the light shield member SD10 is positioned at a cross point P shown in FIG. 16. The cross point P is a point at which a line connecting the light source of the projector for projecting the image on the projection surface on the tread-board and the boundary of the projection surface of the cross-board 22*a*, and a line connecting the light source of the projector for projecting the image on the projection surface on the cross-board and the boundary of the projection surface of the tread-board 20*b*.

The light shield members SD1 and SD2 are not limited to those shown in FIG. 16.

Figure 17:
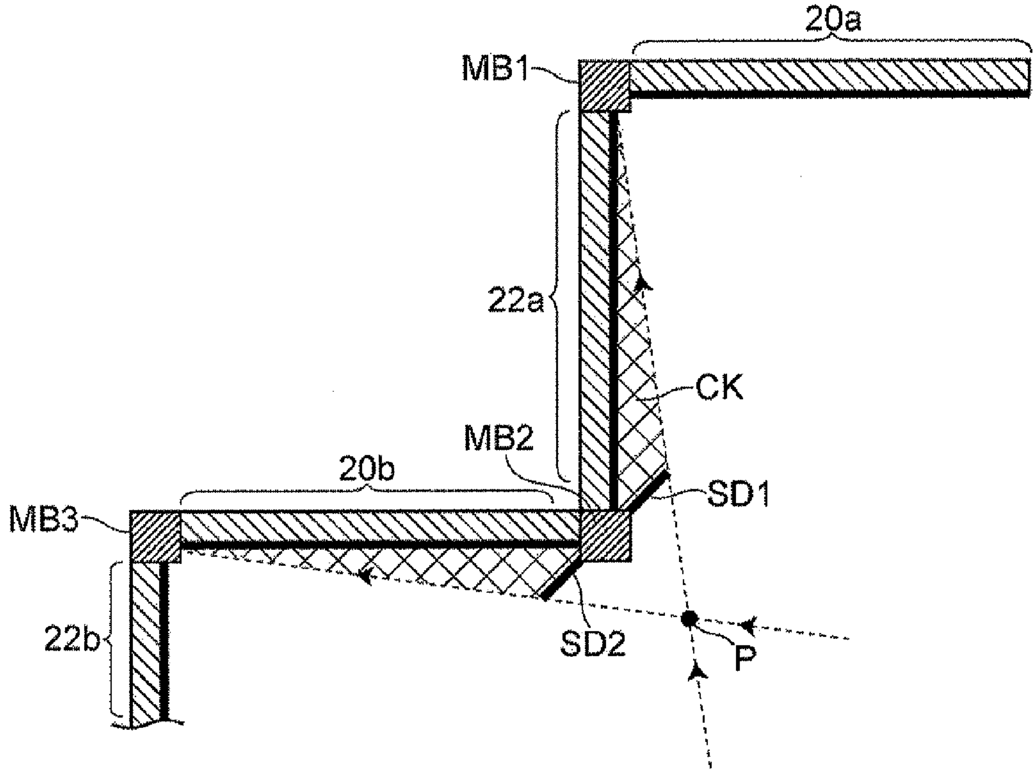
FIG. 17 illustrates other examples of the first and second light shield members.

FIG. 17 illustrates other examples of the first and second light shield members SD1 and SD2. In FIG. 17, similar reference numbers are given to parts and elements similar to those in FIGS. 12 through 16, and the same explanation is not repeated.

In the structure shown in FIG. 17, the first and second light shield members SD1 and SD2 are provided on the member MB2 similarly to the case shown in FIG. 16. However, the respective light shield members may be disposed not parallel with the cross-boards or tread-boards.

Figure 18:
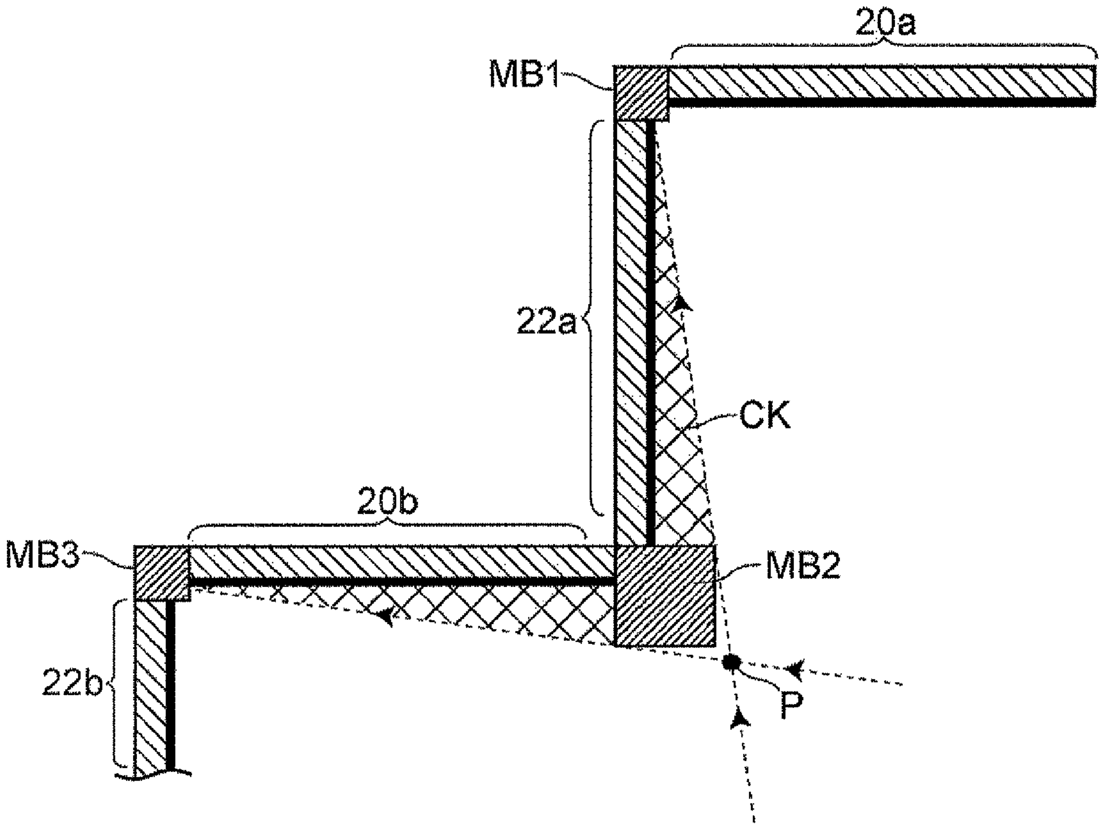
FIG. 18 illustrates further examples of the first and second light shield members.

FIG. 18 illustrates further examples of the first and second light shield members SD1 and SD2. In FIG. 18, similar reference numbers are given to parts and elements similar to those in FIGS. 12 through 16, and the same explanation is not repeated.

According to the structure shown in FIG. 18, the size of the member MB2 is increased such that the member MB2 can obtain the functions of the first and second light shield members SD1 and SD2. In this structure, the member MB2 can shield light at least either the stray light leaked on the second projection surface contained in the light of the projection image onto the first projection surface, or the stray light leaked on the first projection surface contained in the light of the projection image onto the second projection surface without using the light shield member on the member MB2.

3.3 Structure Outline of Projector

It is preferable that the projector PJ shown in FIG. 1, 10 or 11, and the first and second projectors PJ1 and PJ2 shown in FIG. 8 or 9 as the projection unit in the embodiment have the following structure.

Figure 19:
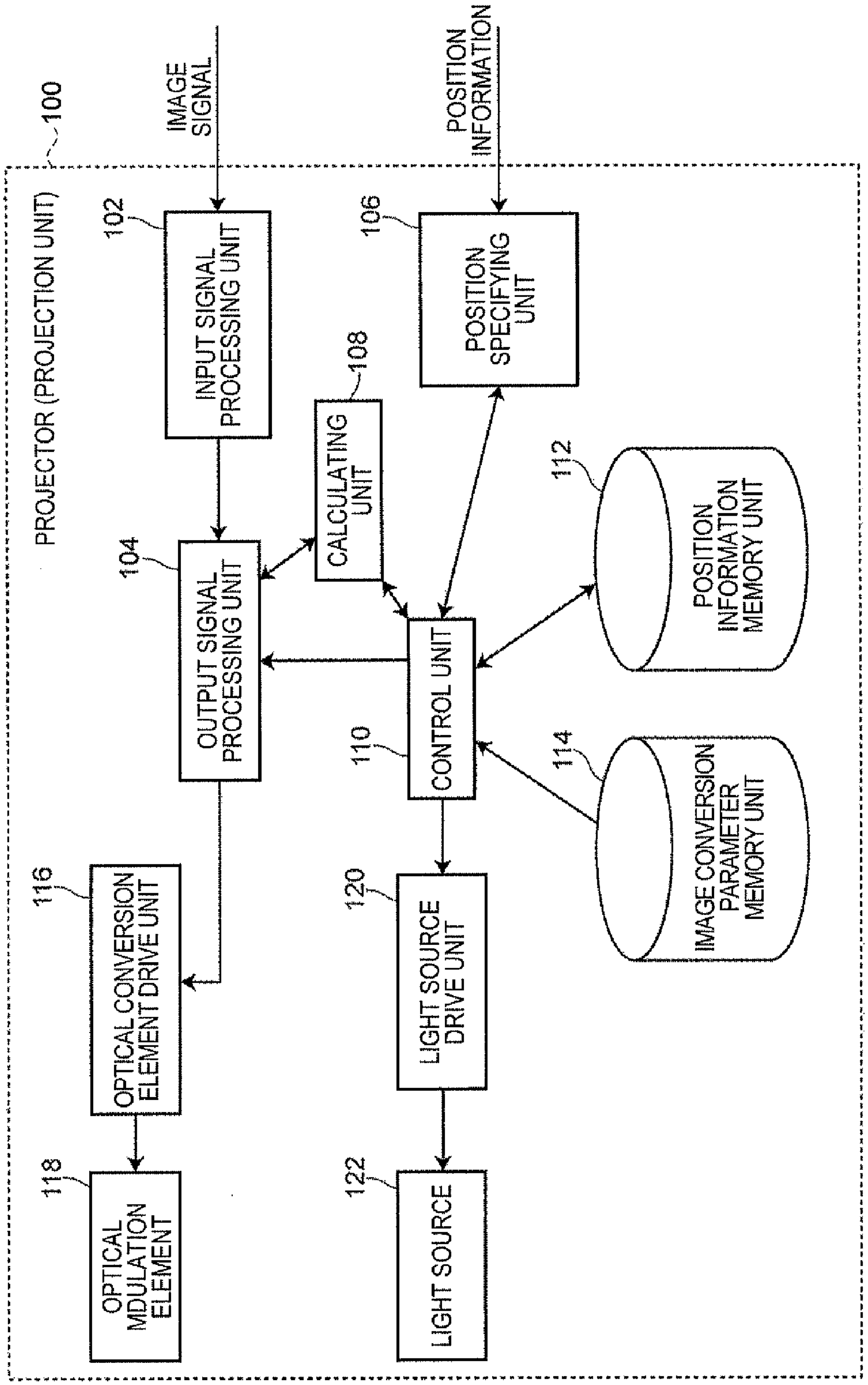
FIG. 19 is a block diagram schematically showing a structure of a projector in this embodiment.

FIG. 19 is a block diagram showing the structure of the projector according to this embodiment. A projector 100 in FIG. 19 is applied to any of the projectors shown in FIGS. 1, and 8 through 11.

The projector 100 in this embodiment includes an input signal processing unit 102, an output signal processing unit 104, a position specifying unit 106, a calculating unit 108, a control unit 110, a position information memory unit 112, an image conversion parameter memory unit 114, a light modulation element driving unit 116, a light modulation element 118, a light source drive unit 120, and a light source 122.

The input signal processing unit 102 performs interface process for receiving an image signal from a not-shown image signal generating unit. The input signal processing unit 102 has a buffer, and develops an image signal representing an original image to the buffer. The output signal processing unit 104 receives an output signal showing the image correction result calculated by the calculating unit 108, and controls the light modulation element drive unit 116 based on the output signal by an instruction from the control unit 110.

The position specifying unit 106 receives position information used for correction of the projection image on the tread-board or cross-board as the projection surface from a not-shown image signal producing unit or the like. This position information is information for associating pixels of the original image represented by the image signal with pixels of the image projected on the projection surface (information for specifying which pixel of the original image corresponds to which pixel of the image projected on the projection surface). The boundary between the first and second projection surfaces and the size of the projection images on the respective projection surfaces are specified based on the position information. The position information are stored in the position information memory unit 112 together with information about the positions of the projection surfaces of the respective screens (such as tread-boards and cross-boards) of the image display apparatus 10 and degrees of inclination of the original image for each of the projection surfaces. The calculating unit 108 performs image correction process for correcting the size, shape, color unevenness, or the like of the image projected on the tread-boards or cross-boards as the projection surfaces in response to a command from the control unit 110.

The image conversion parameter memory unit 114 stores in advance image conversion parameters used for the conversion process of the image signal executed based on the position information. The control unit 110 gives the position information stored in the position information memory unit 112, information about the positions of the projection surfaces of the respective screens and the degree of inclination of the original image for each of the projection surfaces, and the image conversion parameters stored in the image conversion parameter memory unit 114 to the calculating unit 108, and commands the calculating unit 108 to execute the image correction. The calculating unit 108 having received this command performs the image correction as described above. The control unit 110 further controls the light source drive unit 120. Thus, the control unit 110 controls respective components included in the projector 100.

In the structure shown in FIG. 19, the functions of the output signal processing unit 104, the calculating unit 108, and the control unit 110 are performed by a central processing unit which reads a program specifying the procedures discussed above, for example.

The light modulation element drive unit 116 drives the light modulation element 118. More specifically, the light modulation element drive unit 116 controls passing rate (modulation rate, transmissivity) of light of each pixels based on the output signal from the output signal processing unit 104. The light source drive unit 120 drives a light source 122. More specifically, the light source drive unit 120 controls light intensity of the light source 122 in response to the command from the control unit 110.

Figure 20:
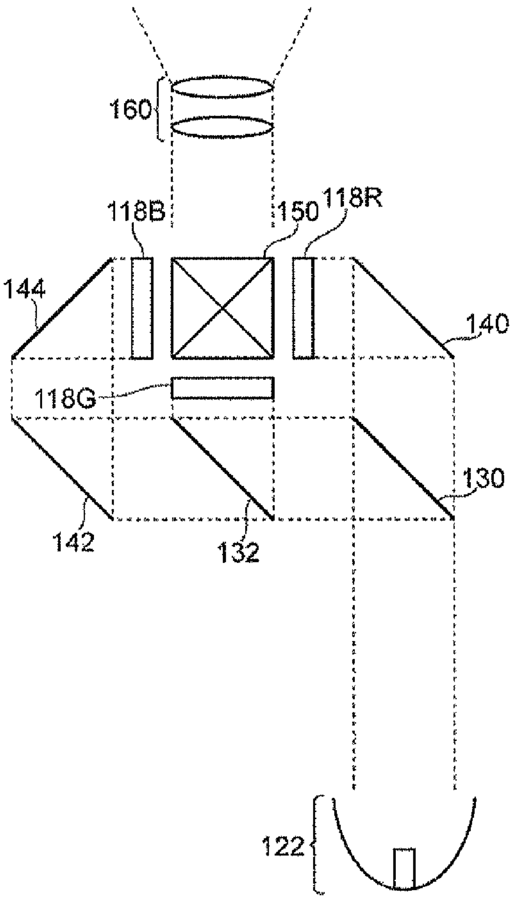
FIG. 20 illustrates a structure example of a light modulation element and a light source shown in FIG. 19.

FIG. 20 illustrates examples of the light modulation element 118 and the light source 122 shown in FIG. 19. FIG. 20 shows an example of a so-called 3LCD system, but the light modulation element 118 and the light source 122 shown in FIG. 19 may be DLP (digital light processing; registered trademark) or LCOS (liquid crystal on silicon) system. FIG. 20 does not show components such as polarized light conversion element and capacitor lens.

The light modulation element 118 shown in FIG. 20 includes light valves 118R, 118G and 118B. The light source 122 includes a reflector and an arc tube. The projector 100 further includes dichroic mirrors 130 and 132, total reflection mirrors 140, 142 and 144, a cross dichroic prism 150, and a projection system 160.

In the projector 100 having this structure, light emitted from the arc tube of the light source 122 driven by the light source drive unit 120 is collimated by the reflector, a not-shown concave lens, and the like, and released as collimated light.

The dichroic mirror 130 transmits only red light contained in the light from the light source 122, and reflects green light and blue light. The total reflection mirror 140 totally reflects the red light having passed through the dichroic mirror 130 and introduces to the light valve 118R.

The dichroic mirror 132 transmits blue light of the green light and blue light reflected by the dichroic mirror 130 and reflects green light. The dichroic mirror 132 guides the reflected green light to the light valve 118G. The total reflection mirrors 142 and 144 introduce the blue light having passed through the dichroic mirror 132 to the light valve 118B.

Each light passing rate (transmissivity, modulation rate) of the light valves 118R, 118G and 118B is controlled for each pixel by the light modulation element drive unit 116. As a result, the red light, green light, and blue light are modulated for each color. The respective light valves 118R, 118G and 118B are liquid crystal panels. The liquid crystal panel contains liquid crystals as electro-optic substances sealed between a pair of transparent glass substrates to be closed.

The liquid crystal panel modulates the passing rate of the respective color lights in accordance with the control signal from the light modulation element drive unit 116 by using polysilicon TFT as switching elements.

The cross dichroic prism 150 functions as a combining system for combining red light modulated by the light valve 118R, green light modulated by the light valve 118G, and blue light modulated by the light valve 118B. The cross dichroic prism 150 has a substantially square shape in the plan view formed by affixing four rectangular prisms, and dielectric multilayer films are formed on the boundary surfaces of the affixed rectangular prisms substantially in an X shape. The dielectric multilayer film formed on one of the substantially X-shaped boundary surfaces reflects red light, and the dielectric multilayer film formed on the other boundary surface reflects blue light. The red light and blue light are bent by these dielectric multilayer films such that the red and blue lights can travel in the travel direction of the green light. As a result, the three color lights are combined.

The light combined by the cross dichroic prism 150 by this method is projected as the projection image via the projection system 160 constituted by projection lens and other components.

An example of the detailed processing performed by the projector 100 is now explained. In this process, the second projector PJ2 for projecting projection images on the cross-boards of the step shown in FIG. 8 is discussed as an example.

Figure 21:
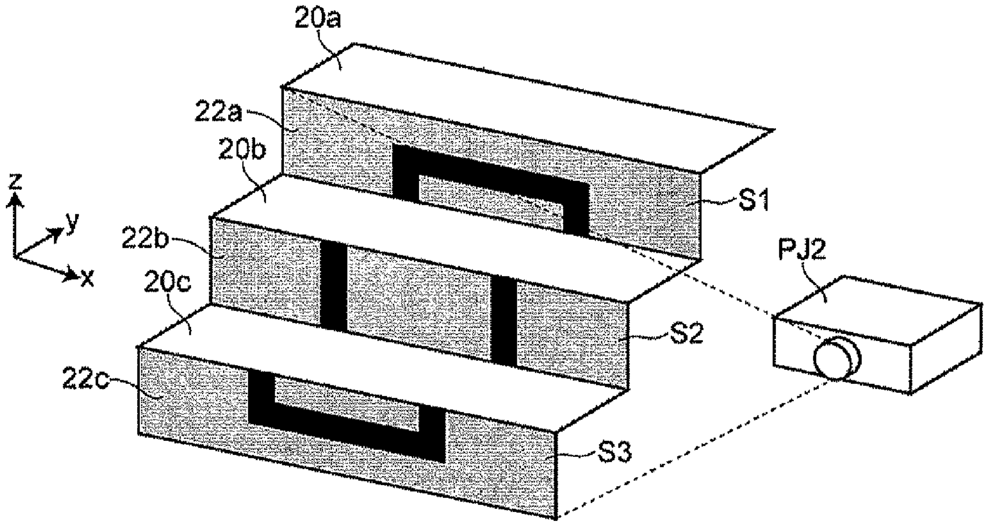
FIG. 21 illustrates a second projector shown in FIG. 8 which projects a projection image on cross-boards of a step.

FIG. 21 illustrates the second projector PJ2 shown in FIG. 8 for projecting projection images on the cross-boards of the step. In FIG. 21, similar reference numbers are given to parts and elements similar to those in FIGS. 7 through 9, and the same explanation is not repeated.

The second projector PJ2 projects a projection image on the plural cross-boards 22*a*, 22*b* and 22*c* of the step as illustrated in FIG. 21. In this case, the observer of the image on the display surfaces as the cross-boards of the step can recognize one image on the step as the image display apparatus.

Figure 22:
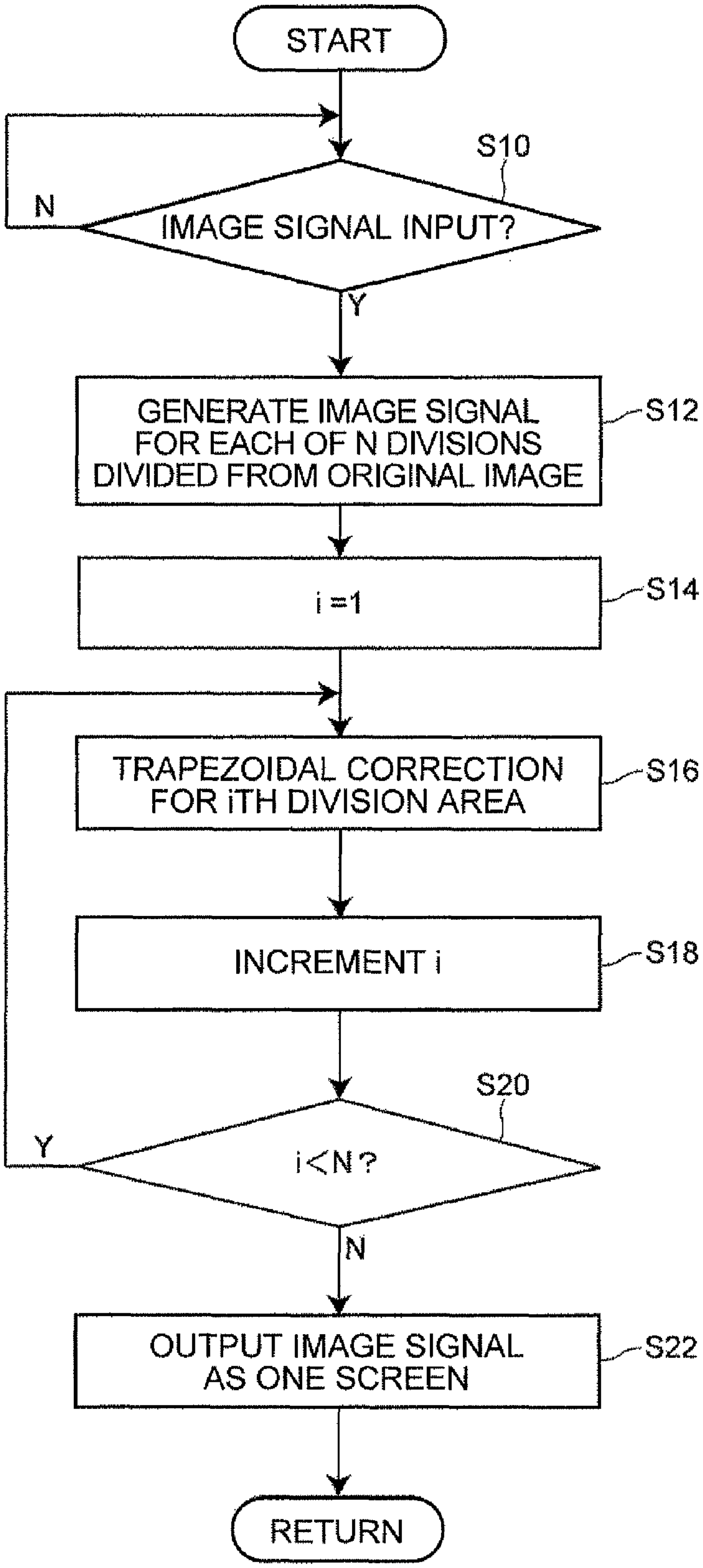
FIG. 22 is a flowchart showing process example performed by the second projector shown in FIG. 21.

FIG. 22 is a flowchart showing the processes performed by the second projector PJ2 illustrated in FIG. 21.

Figure 23A:
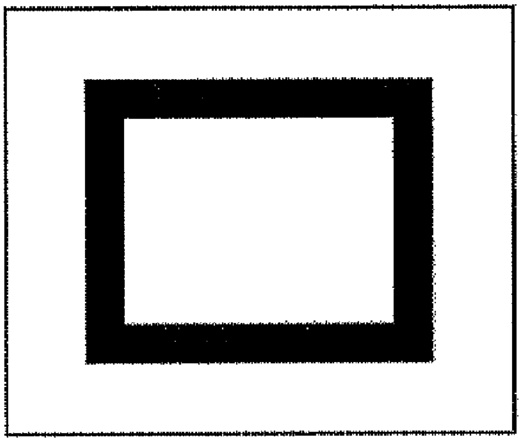
FIGS. 23A, 23B and 23C show respective processes shown in FIG. 22.
Figure 23B:
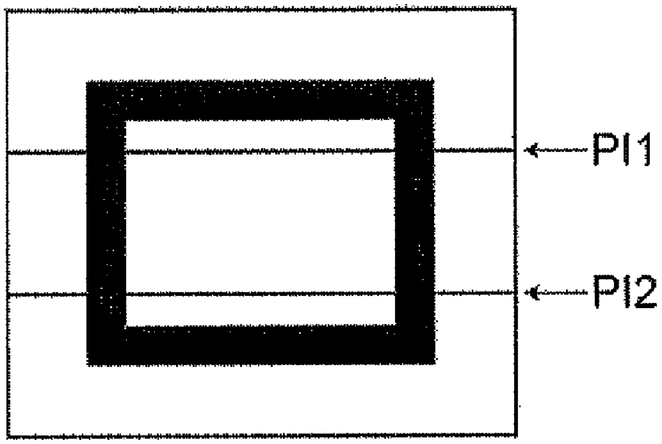
Figure 23C:
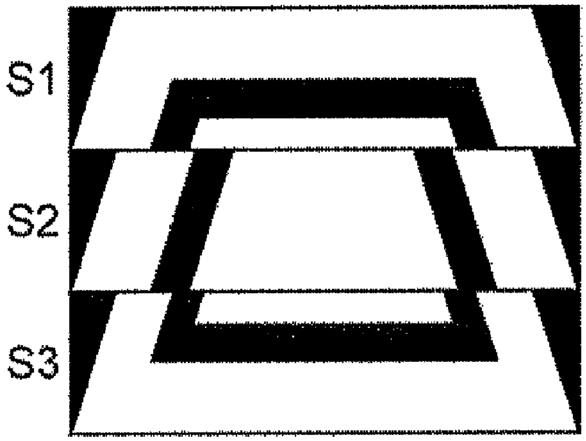

FIGS. 23A, 23B, and 23C illustrate respective processes in FIG. 22.

The second projector PJ2 has the structure shown in FIG. 19. The second projector PJ2 has a not-shown program memory and a CPU for performing functions of the control unit 110 and other units, and stores the program showing the flow to be described later in the program memory. The CPU having read this program performs the following processes Initially, the input signal processing unit 102 monitors the presence or absence of the input of the image signal (step S10: N). In this step, the image signal inputted to the input signal processing unit 102 is a signal for representing the image shown in FIG. 23A.

When the input signal processing unit 102 detects the input of the image signal in step S10 (step S10: Y), the control unit 110 gives the position information or the like stored in the position information memory unit 112 in advance and the image parameter stored in the image conversion parameter memory unit 114 to the calculating unit 108 such that the calculating unit 108 can perform image correction process. In this case, the position information corresponds to information P11 and P12 for specifying the boundary lines between the respective division areas as illustrated in FIG. 23B, for example. By this method, the calculating unit 108 produces image signals for each of the divided N division areas (N: 2 or larger integer, N=3 in FIG. 23B), and performs trapezoidal correction for each division area.

As a result, the calculating unit 108 produces an image signal for each division area of the three divisions based on the position information from the image signal of the original image as illustrated in FIG. 23B (step S12). Then, "1" is set as a parameter i (step S14) to perform known trapezoidal correction using the image conversion parameter for the image signal of the ith division area (step S16). Subsequently, the calculating unit 108 increments the parameter i (step S20), and returns to step S16 when the parameter i is N or smaller (step S20: Y).

When the parameter i is larger than N in step S20 (step S20: N), the output signal processing unit 104 having received the image after trapezoidal processing for the respective division areas from the calculating unit 108 outputs an image signal for one screen (step S22), and ends a series of processing. As a result, an image signal after trapezoidal correction is produced for each division area as illustrated in FIG. 23C. The projection images corresponding to the image signals thus produced are projected on the cross-boards 22*a*, 22*b* and 22*c* of the step as illustrated in FIG. 21 as an image formed on the plural cross-boards and easily recognized.

While the original images for cross-boards are divided for each image area projected on the cross-boards, the invention is not limited to this. The original image may be an image shown on both the cross-boards and tread-boards.

When the image shown on the plural tread-boards is corrected by the projector, the projection image is projected on each of the tread-board 20*a* (first screen), the cross-board 22*b* (second screen), and the tread-board 20*b* (third screen) of the image display apparatus 10 of the embodiment to display the transmitted image of each projection image. In this case, it is only required that the projection image projected on the first projection surface as the tread-board 20*a* is separated from the image projected on the third projection surface as the tread-board 20*b*. Then, the image projected on the first projection surface and the image projected on the third projection surface are separately corrected by trapezoidal correction to project the image which separately corrected by trapezoidal correction on the first and third projection surfaces, respectively. By this method, the images on the first screen and the third screen can be visually recognized as a continuous image.

While the image display apparatus, the image display system and the image display method according to the invention have been described in the embodiments herein, the invention is not limited to the above respective embodiments. It is intended that other modifications and changes may be made without departing from the scope and spirit of the invention. For example, the following changes may be made.

(1) According to this embodiment, the structure and the process applied to the step of the building have been chiefly discussed, the invention is not limited to this. These structure and process may be applicable to a folding-screen-shaped image display apparatus shown in FIG. 3. Alternatively, these structure and process may be applicable to a vertical and horizontal bellows-shaped structure of plural screens disposed adjacent to one another in the vertical and horizontal directions.

(2) According to this embodiment, the first and third screens SCR1 and SCR3 are applied to the tread-boards of the step, and the second screen SCR2 is applied to the cross-boards of the step. However, the first and third screens SCR1 and SCR3 may be applied to the cross-boards of the step, and the second screen SCR2 may be applied to the tread-boards of the step.

(3) The light shield members included are not limited to the examples shown in this embodiment, but may be other structures as long as they can shield stray light reaching the projection surfaces other than the target projection surface.

(4) While the projector according to this embodiment performs trapezoidal correction for the image signal, the invention is not limited to this. The projector may execute other correction process for the size and shape of the image, color unevenness correction, or others.

(5) While the processes performed for the projector which projects images on the cross-boards have been discussed in this embodiment, the invention is not limited to this. The image correction processing may be similarly performed for a projector which projects images on the tread-boards. In this case, the image correction process may be executed for the images divided for the tread-boards, and the image correction process may be also executed for the images divided for the cross-boards when the image is shown on both the tread-boards and cross-boards.

(6) While the transmission-type liquid crystal panel has been used as the light valve in this embodiment, the invention is not limited to this. Components such as DLP (digital light processing; registered trademark), and LCOS (liquid crystal on silicon) as the light valve may be used as the component other than the transmission-type liquid crystal panel.

(7) While the invention has been applied to an image display apparatus, an image display system including the image display apparatus, and an image display method, the invention is not limited to this. The invention may be applicable to a program showing the procedures of the image display method, or a recording medium on which the program is recorded.

What is claimed is:

1. An image display apparatus which displays an image as a transmitted projection image, comprising:
- a tread-board of a step which has a first projection surface and transmits a first projection image projected on the first projection surface; and
- a cross-board of the step which has a second projection surface and transmits a second projection image projected on the second projection surface, wherein:
- the cross-board and the tread-board form a stair, and
- the tread-board and the cross-board are configured to receive the first projection image and the second projection image simultaneously from a single light source.

2. The image display apparatus according to claim 1, wherein:
- the tread-board of the step has a screen unit formed by overlapping a transparent member and a transmission type light diffusion member; and
- the transmission type light diffusion member is disposed on the first projection surface side.

3. The image display apparatus according to claim 1, wherein:
- the cross-board of the step has a screen unit formed by overlapping a transparent member and a transmission type light diffusion member; and
- the transmission type light diffusion member is disposed on the second projection surface side.

4. The image display apparatus according to claim 1, further comprising an optical path change unit which changes an optical path of a projection unit which projects at least either the projection image on the first projection surface or the projection image on the second projection surface.

5. The image display apparatus according to claim 1, further comprising a light shield member which shields at least either stray light leaked on the second projection surface contained in the light of the projection image onto the first projection surface, or stray light leaked on the first projection surface contained in the light of the projection image onto the second projection surface.

6. An image display system which displays an image as a transmitted projection image, comprising:

a tread-board of a step which has a first projection surface and transmits a first projection image projected on the first projection surface;

a cross-board of the step which has a second projection surface and transmits a second projection image projected on the second projection surface, the cross-board and the tread-board forming a stair; and a projection unit which projects an image on the first and second projection surfaces simultaneously with a single light source, wherein the projection unit is provided on both the first projection surface side and the second projection surface side.

7. An image display method which displays an image as a transmitted projection image, comprising:

projecting an image using a single light source:

on a tread-board of a step including a first projection surface and transmitting a first projection image projected on the first projection surface, and on a cross-board of a step including a second projection surface and transmitting a second projection image projected on the second projection surface, the cross-board and the tread-board forming a stair.

8. The image display method according to claim 7, further comprising:

dividing an image to be projected on the first projection surface and an image to be projected on a third projection surface provided on the second tread-board of the step from an original image representing one image; and separately performing trapezoidal-correction for the image projected on the first projection surface and the image projected on the third projection surface, wherein the projecting of an image projects the separately trapezoidal-corrected images on the first and third projection surfaces.

9. The image display apparatus according to claim 1, wherein the stair is configured to be walked upon.

10. The image display apparatus according to claim 1, wherein the first projection surface and the second projection surface are transmission type screens.

11. The image display apparatus according to claim 1, further comprising a third projection surface, the third projection surface being coupled to the second projection surface.

12. The image display apparatus according to claim 1, wherein an end of the tread-board and an end of the cross-board are fixed to a wall.

* * * * *